US010368135B2

(12) United States Patent
Johnson et al.

(10) Patent No.: US 10,368,135 B2
(45) Date of Patent: Jul. 30, 2019

(54) METHOD AND SYSTEM FOR IMPROVED INTERACTIVE TELEVISION PROCESSING

(71) Applicant: HSNi, LLC, St. Petersburg, FL (US)

(72) Inventors: Gerard C. Johnson, Wesley Chapel, FL (US); Sean Bunner, St. Petersburg, FL (US); John McDevitt, Clearwater, FL (US)

(73) Assignee: HSNi, LLC, St. Petersburg, FL (US)

( * ) Notice: Subject to any disclaimer, the term of this patent is extended or adjusted under 35 U.S.C. 154(b) by 309 days.

(21) Appl. No.: 15/267,310

(22) Filed: Sep. 16, 2016

(65) Prior Publication Data

US 2017/0006345 A1 Jan. 5, 2017

Related U.S. Application Data

(63) Continuation of application No. 14/731,594, filed on Jun. 5, 2015, now abandoned, which is a continuation
(Continued)

(51) Int. Cl.
*G06Q 30/00* (2012.01)
*H04N 21/478* (2011.01)
(Continued)

(52) U.S. Cl.
CPC ....... *H04N 21/47815* (2013.01); *G06Q 30/02* (2013.01); *G06Q 30/0217* (2013.01);
(Continued)

(58) Field of Classification Search
None
See application file for complete search history.

(56) References Cited

U.S. PATENT DOCUMENTS

| 4,928,168 A | 5/1990 | Iwashita |
| 4,994,908 A | 2/1991 | Kuban et al. |

(Continued)

FOREIGN PATENT DOCUMENTS

| CA | 2 415 482 A1 | 1/2002 |
| WO | WO-02/063426 A2 | 8/2002 |

OTHER PUBLICATIONS

Jim Davis; "Hauppauge offering card for Intercase"; Jul. 1, 1996, Intercast dying of neglect—CNET News, retrieved on Mar. 28, 2012, http://news.cnet.com/Intercase-dying-of-neglect/2100-1001_3-266113.html.
(Continued)

*Primary Examiner* — Mila Airapetian
(74) *Attorney, Agent, or Firm* — Arent Fox LLP

(57) ABSTRACT

A system and method is disclosed to transmit electronic information to a user of a step-top box. The system includes a database that stores user registration and product information data. A set-top box is also provided that communicates with a remote controller with a touch screen and a server broadcasts the product information data to a plurality of set-top boxes for display on touch screens of remote controller communicating with the set-top boxes, respectively, without the product information being designated for a specific user of one set-top box. The server also transmits updated product information data that replaces a portion of the original product information data. Furthermore, a processor compares data relating to a transaction request from a user of one set-top box with user registration data stored in the database to identify the user, and that generates customized transaction data that is transmitted to the identified user.

20 Claims, 30 Drawing Sheets

Related U.S. Application Data of application No. 13/660,693, filed on Oct. 25, 2012, now Pat. No. 9,117,234, which is a continuation of application No. 12/787,144, filed on May 25, 2010, now Pat. No. 8,326,692, which is a continuation of application No. 11/948,818, filed on Nov. 30, 2007, now Pat. No. 7,752,083.

(60) Provisional application No. 60/872,330, filed on Dec. 1, 2006.

(51) Int. Cl.
  *G06Q 30/02* (2012.01)
  *G06Q 30/06* (2012.01)
  *H04N 21/254* (2011.01)
  *H04N 21/258* (2011.01)
  *H04N 21/41* (2011.01)
  *H04N 21/4185* (2011.01)
  *H04N 21/658* (2011.01)
  *H04N 21/81* (2011.01)

(52) U.S. Cl.
  CPC ..... *G06Q 30/0601* (2013.01); *G06Q 30/0603* (2013.01); *H04N 21/2542* (2013.01); *H04N 21/25841* (2013.01); *H04N 21/25891* (2013.01); *H04N 21/4126* (2013.01); *H04N 21/4185* (2013.01); *H04N 21/6581* (2013.01); *H04N 21/812* (2013.01)

(56) References Cited

U.S. PATENT DOCUMENTS

| | | |
|---|---|---|
| 5,046,093 A | 9/1991 | Wachob |
| 5,077,607 A | 12/1991 | Johnson et al. |
| 5,093,718 A | 3/1992 | Hoarty et al. |
| 5,325,423 A | 6/1994 | Lewis |
| 5,438,355 A | 8/1995 | Palmer |
| 5,451,998 A | 9/1995 | Hamrick |
| 5,455,619 A | 10/1995 | Truckenmiller et al. |
| 5,469,206 A | 11/1995 | Strubbe et al. |
| 5,481,542 A | 1/1996 | Logston et al. |
| 5,539,450 A | 7/1996 | Handelman |
| 5,565,908 A | 10/1996 | Ahmad |
| 5,572,442 A | 11/1996 | Schulhof et al. |
| 5,581,270 A | 12/1996 | Smith et al. |
| 5,592,212 A | 1/1997 | Handelman |
| 5,663,757 A | 9/1997 | Morales |
| 5,666,293 A | 9/1997 | Metz et al. |
| 5,673,401 A | 9/1997 | Volk et al. |
| 5,812,931 A | 9/1998 | Yuen |
| 5,818,935 A | 10/1998 | Maa |
| 5,845,263 A | 12/1998 | Camaisa et al. |
| 5,872,589 A | 2/1999 | Morales |
| 5,897,623 A | 4/1999 | Fein et al. |
| 5,898,919 A | 4/1999 | Yuen |
| 5,903,816 A | 5/1999 | Broadwin et al. |
| 5,905,521 A | 5/1999 | Gatto et al. |
| 5,929,850 A | 7/1999 | Broadwin et al. |
| 5,960,411 A | 9/1999 | Hartman et al. |
| 5,973,680 A | 10/1999 | Ueda |
| 5,973,756 A | 10/1999 | Erlin |
| 5,990,927 A | 11/1999 | Hendricks et al. |
| 5,999,624 A | 12/1999 | Hopkins |
| 6,002,394 A | 12/1999 | Schein et al. |
| 6,085,171 A | 7/2000 | Leonard |
| 6,129,274 A | 10/2000 | Suzuki |
| 6,185,585 B1 | 2/2001 | Sequeira |
| 6,211,879 B1 | 4/2001 | Soohoo |
| 6,253,228 B1 | 6/2001 | Ferris et al. |
| 6,275,989 B1 | 8/2001 | Broadwin et al. |
| 6,286,139 B1 | 9/2001 | Decinque |
| 6,317,855 B1 | 11/2001 | Horibe |
| 6,317,885 B1 | 11/2001 | Fries |
| 6,357,043 B1 | 3/2002 | Ellis et al. |
| 6,446,262 B1 | 9/2002 | Malaure et al. |
| 6,459,427 B1 | 10/2002 | Mao et al. |
| 6,604,242 B1 | 8/2003 | Weinstein et al. |
| 6,665,017 B1 | 12/2003 | Raiyat |
| 6,711,552 B1 | 3/2004 | Kay et al. |
| 6,873,969 B2 | 3/2005 | Stone et al. |
| 7,017,175 B2 | 3/2006 | Alao et al. |
| 7,065,780 B2 | 6/2006 | Barbier et al. |
| 7,194,754 B2 | 3/2007 | Tomsen et al. |
| 7,237,185 B1 | 6/2007 | Sequeira et al. |
| 7,243,139 B2 | 7/2007 | Ullman et al. |
| 7,752,083 B2 | 7/2010 | Johnson et al. |
| 2001/0013123 A1* | 8/2001 | Freeman ............... H04H 60/07 725/34 |
| 2001/0042002 A1 | 11/2001 | Koopersmith |
| 2002/0002538 A1 | 1/2002 | Ling |
| 2002/0019763 A1 | 2/2002 | Linden et al. |
| 2002/0034980 A1* | 3/2002 | Lemmons ............... A63F 3/081 463/40 |
| 2002/0040482 A1 | 4/2002 | Sextro et al. |
| 2002/0055878 A1 | 5/2002 | Burton et al. |
| 2002/0072974 A1 | 6/2002 | Pugliese, III et al. |
| 2002/0133413 A1 | 9/2002 | Chang et al. |
| 2002/0169675 A1 | 11/2002 | Helot et al. |
| 2002/0169885 A1 | 11/2002 | Alao et al. |
| 2002/0184623 A1 | 12/2002 | Hodge et al. |
| 2003/0028883 A1* | 2/2003 | Billmaier ............... H04N 7/163 725/46 |
| 2003/0033157 A1* | 2/2003 | Dempski ............. H04N 5/4401 725/32 |
| 2003/0033213 A1 | 2/2003 | Bogot |
| 2003/0097664 A1 | 5/2003 | Meyers et al. |
| 2003/0110507 A1 | 6/2003 | Dimitrova et al. |
| 2003/0158796 A1 | 8/2003 | Balent |
| 2003/0182658 A1 | 9/2003 | Alexander |
| 2003/0188310 A1 | 10/2003 | Klosterman et al. |
| 2003/0226141 A1 | 12/2003 | Krasnow et al. |
| 2004/0034571 A1 | 2/2004 | Wood et al. |
| 2004/0044564 A1 | 3/2004 | Dietz et al. |
| 2004/0060068 A1 | 3/2004 | Barbier et al. |
| 2004/0139480 A1 | 7/2004 | Delpuch et al. |
| 2004/0163113 A1 | 8/2004 | Namvar |
| 2004/0210947 A1 | 10/2004 | Shusman |
| 2005/0071242 A1 | 3/2005 | Allen et al. |
| 2005/0169255 A1 | 8/2005 | Shimomura et al. |
| 2005/0193425 A1 | 9/2005 | Sull et al. |
| 2005/0242755 A1 | 11/2005 | George |
| 2006/0117340 A1 | 6/2006 | Pavlovskaia et al. |
| 2006/0235764 A1 | 10/2006 | Bamborough et al. |
| 2006/0265290 A1 | 11/2006 | Perrier et al. |
| 2006/0271437 A1 | 11/2006 | Maggio |
| 2006/0288374 A1* | 12/2006 | Ferris ................... H04H 20/33 725/62 |
| 2006/0293965 A1 | 12/2006 | Burton |
| 2007/0016488 A1 | 1/2007 | Ulenas |
| 2007/0033531 A1* | 2/2007 | Marsh ................... G06Q 30/02 715/738 |
| 2007/0124201 A1 | 5/2007 | Hu et al. |
| 2007/0157251 A1 | 7/2007 | Shrivastava et al. |
| 2007/0185778 A1 | 8/2007 | Weng |
| 2007/0186252 A1 | 8/2007 | Maggio |
| 2008/0065502 A1 | 3/2008 | Diaz Perez |
| 2008/0077955 A1* | 3/2008 | Haberman ............. G06Q 30/02 725/35 |
| 2008/0086752 A1 | 4/2008 | Perez |
| 2008/0245863 A1 | 10/2008 | Buchheit |

OTHER PUBLICATIONS

Brook Crothers and Denise Shelton; "Intel, NBC to cover Olympics on PC-TV"; Jun. 25, 1996; CNET News, retrieved on Mar. 28, 2012, http://news.cnet.com/2100-1023-215703.html.

Lisa Sanders; "PC Meets TV: The Plot Thickens"; Business Week, 1996, retrieved Mar. 28, 2012, http://www.businessweek.com/1996/52/b3507114.htm.

(56) References Cited

OTHER PUBLICATIONS

"Intel, Microsoft to Align Efforts on Interactive Technology in Windows 98"; Microsoft to Include Support for intel's Intercase Technology in Windows 98; 1998, retrieved Mar. 28, 2012, http://www.microsoft.com/presspass/press/1998/Apr98/intelpr.mspx.
Intercast definition from Wikipedia, the free encyclopedia; retrieved Mar. 28, 2012 http://en.wikipedia.org/wiki/Intercast.
"Shopping & Banking Video Vault"; BroadbandBananas Interactive TV Videos; 2005; retrieved Mar. 27, 2012 http://broadbandbananas.com/2005/vvshopping.html.
Paul Demery, Managing Editor; "Move over PCs; here comes interactive shopping via TV remote"; May 11, 2003, Industry Statics; http://www.internetretailer.com/2004/05/11/mover-over-pcs-here-comes-interactive-shoppi . . . May 31, 2012.
OPENTV Corp. Q4 2004 Investor Conference Call, Transcript of Prepared Remarks, Mar. 16, 2005, 2:00pm PST.
Lorrie Grant; "Networks hope remote-control shopping clicks"; USA Today, posted May 24, 2005, updated May 25, 2005; http://www.usatoday.com/money/industries/retail/2005-05-24-t-commerce-usat_x.htm.
"Ordering through your TV just got easier"; retrieved Apr. 25, 2012 http://www.qvcuk.com/shopqvc_active.htm?qic=y.
"QVC Active—Why?—Virgin Media TV and Phone—Digital Spy Forums"; retrieved Apr. 25, 2012 http://forums.digitalspy.co.uk/showthread.php?t=154953.
"QVC Active extended to reach 5 million Freeview homes"; retrieved Apr. 25, 2012 http://www.m2.com/m2/web/story.php/2005BF4718D2789AD9DB802570AE0037E686.
"QVC UK Selects Ensequence for the Next Generation of QVC Active"; retrieved Apr. 25, 2012 http://www2.prnewswire.co.uk/cgi/news/release?id=181531.
"QVC Active to allow remote purchases"; retrieved Apr. 25, 2012 http://airwaves.techtir.com/satellite/836-qvc-active-to-allow-remote-purchases.
"QVC :: Sold Outrageous—The Museum of TV Shopping"; retrieved Apr. 25, 2012 http://soldoutrageous.com/?page_id=33.
"QVC Milestones"; retrieved Apr. 25, 2012 http://www.qvc.com/qic/qvcapp.aspx/app.html/params.file.%7Ccp%7Cmainhqfbench.html/left.html.file.%7Cnav%7Cnavhqabout.html/walk.html.%7Cnav%7Cnavhqabout.html?& cookie=set.
"QVC Active launches on ntl"; retrieved Apr. 25, 2012 http://d694568.u47.hosting.digiweb.ie/index.php/cable/1616-qvc-active-launches-on-ntl.
Dominique Patton; "QVC launches realtime venture. (QVC Active synchronizes online and television items)(Brief Article)(Statistical Data Included)"; Sep. 14, 2001; retrieved Apr. 25, 2012 http://www.highbeam.com/doc/1G1-78737895.html/print.
Juliette Garside;"QVC Active channel goes fully interactive on Telewest"; brandrepublic.com, Tuesday, Jun. 10, 2003; retrieved Apr. 25, 2012 http://www.prweek.com/uk/news/182334/QVC-Active-channel-goes-fully-interactive-Telewest/.
Kimberly S. Johnson; "Dish users push button to shop HSN"; The Denver Post; retrieved Apr. 25, 2012 http://www.denverpost.com/ci_6008193?source=rss.
"i-Player+and i-Player Forum Index"; retrieved Apr. 25, 2012 http://forum.netgem.com/viewtopic.php?=37026&sid=061dfdef2767ca45eab3d35d278284af.

"QVC Active Launches on Freeview"; submitted by itvt on Nov. 6, 2005; retrieved Apr. 25, 2012 http://www.itvt.com/2005/11/06/qvc-active-launches-on-freeview.
Catherine Applefeld Olson; "T-Commerce! On Sale Now for a Limited Time!"; Dec. 4, 2005; retrieved May 31, 2012 http://www.cable360.net/technology/advancedsvcs/T-Commerce!-On-Sale-Now-for-a-Limited-Time!::Cable360.
"Shopping & Banking Video Vault"; retrieved Mar. 27, 2012 http://www.broadbandbananas.com/2005/vvshopping.html.
"PC Meets TV: The Plot Thickens"; retrieved Mar. 28, 2012 http://www.businessweek.com/1996/52/b3507114.htm.
"Intel, Microsoft to Align Efforts on Interactive TV Programming"; retrieved Mar. 28, 2012 http://www.microsoft.com/presspass/press/1998/Apr98/intelpr.mspx.
"Intercase" from Wikipedia, the free encyclopedia; retrieved Mar. 28, 2012 http://en.wikipedia.org/wiki/Intercast.
"Interactive m—Tech Information—Digital Spy"; retrieved Mar. 27, 2012 http://digitalspy.com/tech/information/a4599/interactive.html, [Mar. 27, 2012 2:13:17 PM].
"QVC UK Selects Ensequence for the Next Generation of QVC Active"; London, Oct. 16; retrieved Apr. 25, 2012 http://www2.prnewswire.co.uk/cgi/news/release?id=181531.
Dominos Pizza on Sky Digital—Updated; as shown in citation "Shopping & Banking Video Vault"; retrieved Mar. 27, 2012 http://www.broadbandbananas.com/2005/vvshopping.html, See CD 1.
QVC Active on Sky Digital (OpenTV); as shown in citation "Shopping & Banking Video Vault"; retrieved Mar. 27, 2012 http://www.broadbandbananas.com/2005/vvshopping.html, See CD 1.
M-Web TV-Shopping(Open TV); as shown in citation "Shopping & Banking Video Vault"; retrieved Mar. 27, 2012 http://www.broadbandbananas.com/2005/vvshopping.html, See CD 1.
IntesaBci TV Banking on Stream Italy (OpenTV); as shown in citation "Shopping & Banking Video Vault"; retrieved Mar. 27, 2012 http://www.broadbandbananas.com/2005/vvshopping.html, See CD 1.
OKRecarga (Mediahighway); as shown in citation "Shopping & Banking Video Vault"; retrieved Mar. 27, 2012 http://www.broadbandbananas.com/2005/vvshopping.html, See CD 1.
Domino's Pizza on Sky (OpenTV); as shown in citation "Shopping & Banking Video Vault"; retrieved Mar. 27, 2012 http://www.broadbandbananas.com/2005/vvshopping.html, See CD 1.
FNAC Boutique on TPS (OpenTV); as shown in citation "Shopping & Banking Video Vault"; retrieved Mar. 27, 2012 http://www.broadbandbananas.com/2005/vvshopping.html, See CD 2.
Canal Club on CSD (Mediahighway); as shown in citation "Shopping & Banking Video Vault"; retrieved Mar. 27, 2012 http://www.broadbandbananas.com/2005/vvshopping.html, See CD 1.
Robert Henderson; "The potential of the return path Or why interactive television in the UK is making money"; Soundscapes—Journal on Media Culture, retrieved Apr. 25, 2012 from http://www.icce.rug.nl/oger-bin/contents/print.cgi.
"Ensequence powers QVC UK interactivity"; BroadcastEngineering, retrieved Apr. 25, 2012 from http://broadcastengineering.com/news/ensequence_qvc_uk_interactivity/.

* cited by examiner (HSN)

Select your product preference
△ More Options $89.99 – Wolfgang Puck 5-Speed 250 Watt Triple Beater Hand Mixer NOT AVAILABLE – Wolfgang Puck 5-Speed 300 Watt Triple Beater Hand Mixer SOLD OUT – Wolfgang Puck 5-Speed 450 Watt Triple Beater Hand Mixer ▽ More Options ◁Back     ⚠ Help     ⓒExit HSN iTV 356-864　　　Select an option DXG 305V Digital
Camcorder and
MP3 Player ...

Sale Price
$118.95
S&H FREE
4Flex$29.73

SEL　Silver

Blue

Pink

Green

Black

▽　More Options

◁ Back　　　△ Help　　　© Exit HSN iTV

FIG.7

356-864
Select a payment option
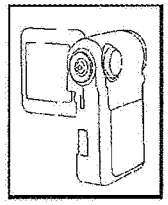
 1 payment of $118.95
4 payments of $29.73
DXG 305V Digital
Camcorder and
MP3 Player ...
Sale Price
$118.95
S&H FREE
4Flex$29.73
◁Back     ⚠ Help     ⓒExit HSN iTV
FIG.8

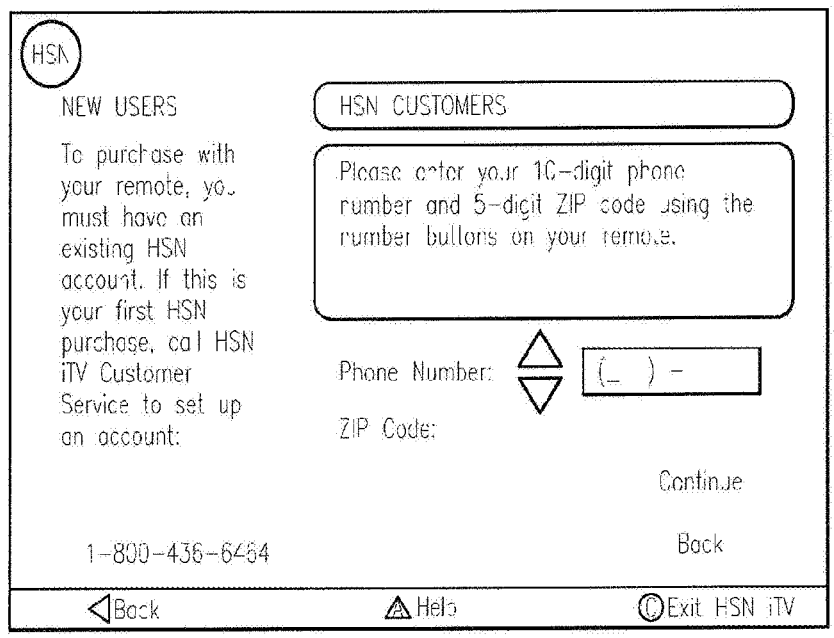
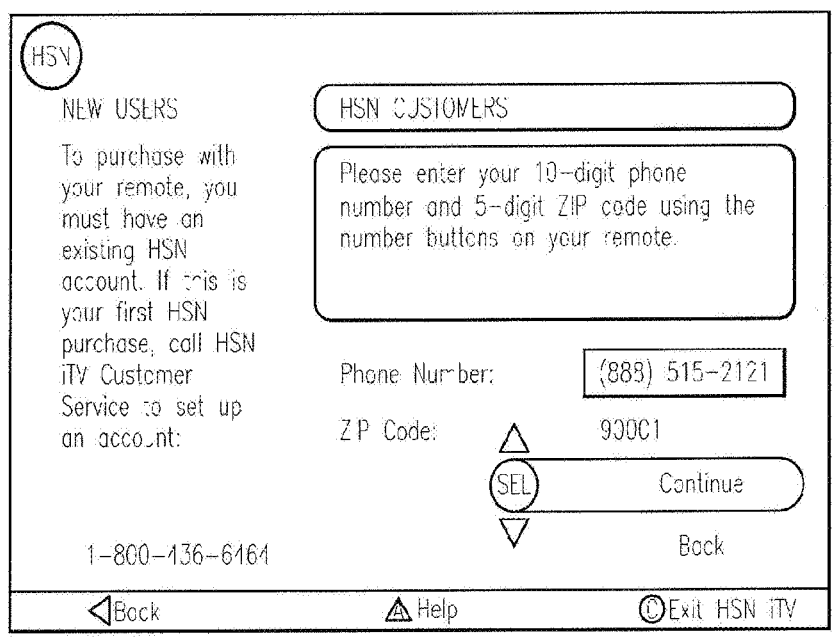
FIG.11

FIG. 12

Unfortunately, the item you selected is
on backorder. It will be shipped within X days.
Your credit card will be billed on the day
the item ships.
Would you like to continue and order this item?
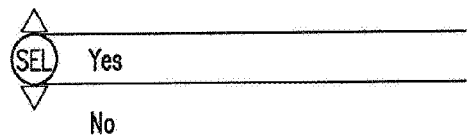
◁ Back　　　⚠ Help　　　© Exit HSN iTV
FIG.15

There was a problem placing this order.
To complete your order, please call HSN iTV
Customer Service at 1-800-436-6464.
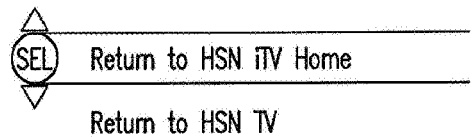
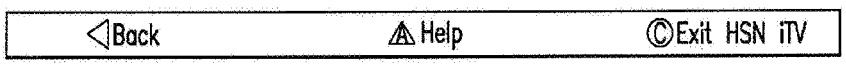
FIG.16

FIG. 17

Press [B] to complete your purchase.

Press ◁ Back to return to the previous page.

FIG.18

  HSN iTV Help Main Menu
What is HSN iTV?
How do I use my TV remote to buy?
How do I contact HSN Customer Service?
Return to my order
◁ Back   ⚠ Help   ⓒ Exit HSN iTV
FIG. 20

What is HSN iTV?

HSN shopping is now interactive and easier than ever! You can now buy the items you see on TV with your remote control.

When you see a product you like, just press the SELECT button on your remote. You will be guided through our safe and secure order process. You can check the status of Page 1 of 2 ▷

(SEL) Return to my order

Return to Help Main Menu

◁ Back     ⚠ Help     ⓒ Exit HSN iTV

---

What is HSN iTV?

your order by using your iTV order number on hsn.com or by calling HSN customer service.

Remember: You must have an HSN iTV PIN set up in order to use HSN iTV. If you have never shopped with HSN iTV, call 1-800-436-6464 to have an HSN iTV PIN number created.
This process will only take a few minutes.

◁ Page 2 of 2

(SEL) Return to my order

Return to Help Main Menu

◁ Back     ⚠ Help     ⓒ Exit HSN iTV

FIG.21

 How do I use my TV remote to buy?
 Select a product/option and go on to next step
 Navigate on the screen or move back a page to see more choices
 Go to help menu
 Buy it – completes a purchase (order review page ONLY)
 Exit HSN iTV and return to live program
 Return to my order
Return to Help Main Menu
◁Back    ⚠Help    ⓒExit HSN iTV
FIG.22

How do I contact HSN iTV Customer Service?
Still have more questions about HSN iTV?
Call HSN iTV Customer Service at 1-800-436-6464
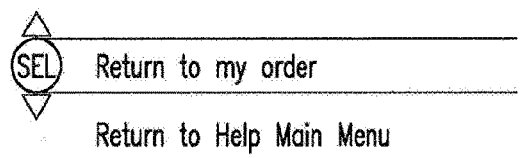
Return to Help Main Menu
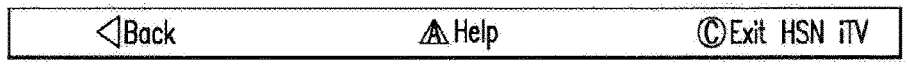
FIG.23

Please wait, your order is being processed...
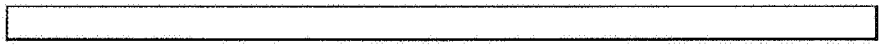
FIG.24

HSN iTV isn't available right now.

Please call HSN iTV Customer Service at 1-800-436-6464 to place an order quickly over the phone or visit www.hsn.com.

We should have HSN iTV up and running shortly.

◁ Back     ⚠ Help     © Exit HSN iTV

Due to system delays, we can confirm that your order was placed.

Please call HSN iTV Customer Service at 1-800-436-6464 to confirm the status of your order.

We apologize for any inconvenience.

◁Back   ⚠Help   ©Exit HSN iTV

We have encountered a connection problem.
To complete your order, please call
HSN iTV Customer Service at 1-800-436-6464.
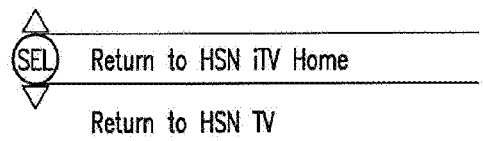
Return to HSN TV
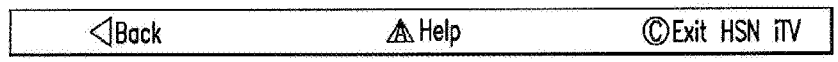
FIG.27

Please wait, calculating your order total...
FIG.28

This item is not available for sale on HSN iTV.
To order this item, please call 1-800-436-6464.
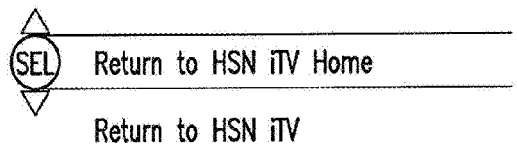
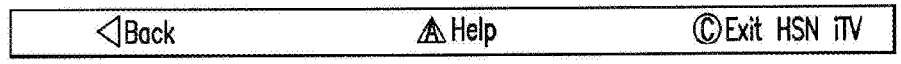
FIG.29

METHOD AND SYSTEM FOR IMPROVED INTERACTIVE TELEVISION PROCESSING

CROSS REFERENCE TO RELATED APPLICATIONS

This application is a continuation of U.S. patent application Ser. No. 14/731,594, filed Jun. 5, 2015, which is a continuation of U.S. patent application Ser. No. 13/660,693, filed Oct. 25, 2012, now U.S. Pat. No. 9,117,234, which is a continuation of U.S. patent application Ser. No. 12/787,144, now U.S. Pat. No. 8,326,692, filed May 25, 2010, which is a continuation of U.S. patent application Ser. No. 11/948,818, now U.S. Pat. No. 7,752,083, filed Nov. 30, 2007, which claims priority to U.S. Provisional Application No. 60/872,330, filed Dec. 1, 2006. The entire disclosures of each of these applications are incorporated herein by reference into the present application.

FIELD OF THE INVENTION

The present invention relates to a method and system for processing transactions conducted via interaction with a television implemented user interface. In an exemplary embodiment of the present invention, the transactions are processed in real time and product information presented in the user interface is updated in real time.

BACKGROUND

Commerce may be conducted in numerous venues. In particular, commerce may be conducted in real space or electronically, i.e., e-commerce. E-commerce is conducted via a computer network. Servers are used to store product and transaction information and computer terminals are used by purchasers to access the information stored in the server to view and modify such information via a transaction.

E-commerce may also be conducted in the context of interactive television (iTV), e.g., for the purchasing of video-on-demand (VOD). For such interaction, set-top boxes may be programmed for bidirectional communication with a content provider. The set-top box may receive content from a content provider and display the received content on a television (TV) for viewing.

It is desirable to provide an improved iTV e-commerce experience for transactions with respect to products provided in real space, e.g., tactile product related transactions and/or for products that may be physically shipped to a consumer or otherwise communicated or delivered to a customer, e.g., electronically to a cell phone, handheld or personal digital assistant (PDA), other than through the TV, as with VOD programs.

SUMMARY OF THE INVENTION

In an exemplary embodiment of the present invention, a product supplier may communicate to a content provider information regarding available products that may be physically shipped to a consumer or otherwise communicated or delivered to a customer, e.g., electronically to a cell phone, handheld or personal digital assistant (PDA), other than through the TV, as with video-on-demand programs. The product supplier may maintain a server that stores the product information and with which the content provider may be in communication. The content provider may arrange the information received from the server in a format that may be provided to the set-top box for display of the information on the television. For example, the content provider may provide program content for one or more product suppliers on a TV channel. Interaction by the user with the set-top box during display of the channel may cause the set-top box to display content with which the user may begin a transaction to purchase one or more items. Interaction by the user with the display via commands input to the set-top box may be communicated back to the content provider, and then ultimately back to the product supplier. In response to such communication, the product supplier may fulfill a transaction request, e.g., by shipping out the requested product and entering billing information. The product supplier may update the product information stored at the server to reflect the conducted transaction. In an alternative exemplary embodiment, the product supplier may also be a content provider, so that the product supplier server and the components used by the content provider are integrated in a single unit.

Product information may be displayed on the TV in a series of display pages (or a series of frames, which may be concurrently or separately displayed), where different pages (or frames) include different information regarding a product and/or correspond to different points along the transaction process. For example, during a transaction session, the user may navigate between multiple pages for adding different products to an electronic basket and for entering billing and shipping information. A user may navigate between different pages by transmitting commands to the set-top box. In response to each command, the set-top box may display navigable pages, which guide the user through the ordering process. The navigable pages may initially all be transmitted to the set-top box in a single transmission upon a user's expressing interest in shopping or transmitted on a page-by-page basis as needed.

In an exemplary embodiment, TV programming, such as a home shopping program, may include products for sale. Indicia, e.g., adjacent the products for sale may instruct a user to press a predetermined button on his or her remote control to obtain additional information about the product and/or to order the product using the TV. Depression of the predetermined button triggers a program, e.g., in the set-top box, which displays navigation screens the user may follow to purchase the product. This method of purchasing is especially convenient for a user as it does not require the user to make a trip to the store or even make a phone call to order the product. The user does not need to leave his or her comfortable position by the TV and merely has to press a couple of remote control buttons to complete the transaction.

In one exemplary embodiment, the conducted television e-commerce may be limited to batch-type processing (wherein, for example, the server is updated periodically to reflect a number of accumulated transactions) and, thus, falls short of real-time processing (wherein, for example, the server is updated to reflect transactions as they occur), because of the additional time required to make repeated call-backs to the backend server to be routed via the content provider. The use of batch-type processing (and the consequent less frequent updating of the server inherent in real-time processing) increases the risk that navigational links and/or data initially displayed on the TV become outdated during the course of a conducted transaction due to the additional time that elapses because of the indirect connection.

To implement real-time processing, separate connections may be provided for connection of the set-top box to the content provider for receipt of program content according to one communication protocol and for connection of the set-top box to the product-supplier network according to, e.g., a conventional computer network communication protocol, e.g., the Hyper Text Transfer Protocol (HTTP). However, such complex interconnections may be expensive. Exemplary embodiments of the present invention provide a method and/or system that includes real-time transaction processing for transactions conducted via interactive television (iTV), which do not require such complex interconnections.

Exemplary embodiments of the present invention provide for transmission of product information and navigation information, for navigation between multiple pages of product and/or transaction content, in a single instruction file. Exemplary embodiments of the present invention provide for dynamically updating, e.g., even without user interaction, a display including product information of real-space products that may be purchased by interacting with the display via a set-top box.

Exemplary embodiments of the present invention provide for integration of multiple transaction venues, e.g., iTV, Internet, Interactive Voice Response (IVR) systems, and real-space stores by using a single server as a product information source for all of the integrated venues. The single server may be updated to reflect transactions conducted in each of the venues as soon as they occur. The server may include both product information and customer information. The customer information may include a customer transaction history, which may be used by each of the venues to provide a customer-specific price. The price presented in each of the venues may therefore reflect out-of-session transactions. According to this exemplary embodiment, a price displayed on a user's TV during a transaction may have been reduced from a base price because of the user's activity during the transaction session and because of the user's activity out-of-session. The out-of-session activity affecting the displayed (and subsequently charged) price may include activity in another iTV session and/or activity in another one of the integrated venues. In one example embodiment, approximately simultaneous activity by a user or attributed to a single account in multiple venues may cause an update in pricing information provided in each venue.

According to an exemplary embodiment of the present invention, a method for providing an electronic transactional environment may provide for receiving, in a single transmission, product information data for a product information display spanning multiple navigable pages. The product information data may include a first portion for display of an initial page and a second portion for display of a second page and not for use for the display of the initial page. The method may further provide for displaying, based on the first portion, an initial page, receiving a navigation command, and, responsive to the command and based on the second portion, displaying the second page.

The first and second portions may be included in a single data document. The document may be an eXtensible Markup Language (XML) document.

The method may further provide for receiving, in the single transmission, navigation instructions that indicate one or more paths between the navigable pages. The navigable pages may include at least three pages.

At least a portion of the displays may be on a television. The single transmission may be from a server. The method may further provide for updating the server in real-time to reflect transactions performed via interaction by a user with the television as soon as they occur. The method may further provide for updating the server in real-time to reflect transactions performed at least one of in real space, by customers via Internet, and via an Interactive Voice Response (IVR) system, as soon as they occur. The product information data may include an indication of a price of a product. The method may further provide for updating a virtual shopping basket, based on input received from the user during a navigation of the navigable pages, to virtually include the product; after the updating, transmitting a request for a price update for the product; receiving the price update transmitted in response to the request for the price update; and displaying data indicating the price update. The price update may include a price calculated based on transactions by the user conducted external to and simultaneously with the navigation.

The externally conducted transactions may include transactions conducted in real space, via the Internet, and/or via the IVR system.

The request for the price update may include a state of the virtual shopping basket, and the price update may be calculated based additionally on the state of the virtual shopping basket.

The method may further provide for receiving a product information update in a subsequent transmission, and, responsive to the receipt of the update, refreshing a currently displayed page even without receipt of a user command.

The refreshing may include modifying the currently displayed page and may be performed conditional upon product information data of the update being different than the product information data of the single transmission. The modifying may be limited to predetermined scenarios.

The refreshed page may reflect a product state indicated by the update instead of a product state indicated by the product information data of the single transmission.

The method may further provide for receiving at least one subsequent transmission, where each of the at least one subsequent transmission includes a product information data update. The at least one subsequent transmission may be performed periodically at set intervals. The at least one subsequent transmission may be broadcast to multiple set-top boxes. The method may further provide for receiving, by a set-top box, a shopping session initiation instruction, and, responsive to the instruction, transmitting, by the set-top box, a request for product information, where the single transmission is responsive to the request and is addressed to the set-top box.

The at least one subsequent transmission may be performed conditional upon the product information data being updated since a time of the single transmission.

According to an example embodiment of the present invention, a method for providing a transactional environment may provide for updating product information data on a server in real-time to reflect transactions conducted interactively via a plurality of televisions as soon as they occur, transmitting the product information data towards a television, and displaying the product information data on the television.

The method may further provide for receiving at least one first command from a user, interpreting the at least one command in a coordinated manner with respect to the displayed product information data to facilitate a new transaction, updating, based on the interpretation, a virtual shopping basket, receiving a second command, and, responsive to the second command, creating the new transaction by transmitting an order based on the virtual shopping basket.

According to an example embodiment of the present invention, a system for providing a transactional environment may provide a server that is configured to store product information data updated in the server as soon as they occur to reflect transactions conducted interactively via at least one of a plurality of televisions and transmit the product information data towards the plurality of televisions for display of the product information data.

The system may further provide a content provider configured to provide program data to the plurality of televisions and to pass transmissions between the server and the plurality of televisions.

According to an example embodiment of the present invention, a system for providing an electronic transactional environment may provide a television, and a server that is configured to transmit, during a shopping session and in a single transmission, particular product information data towards the television. The single transmission may be (a) an only or (b) a first in time of a plurality of product information data transmissions towards the television during the shopping session. The television may be configured to display an interactive display via which interaction a user can enter a complete order for creating a new transaction.

According to an exemplary embodiment of the present invention, a system for providing an electronic transactional environment, includes a server storing product information data and a set-top box configured to control a display of a television and to receive the product information data. The set-top box receives program data from a content provider. The television communicates with an input device for input by a user of commands to the set-top box. The server is configured to transmit towards the set-top box in a single transmission and in response to a user request the product information data for a product information display to be controlled by the set-top box spanning multiple navigable pages. The product information display includes product information and order information for a product available for purchase. The product information data spans multiple navigable pages and includes a first portion for display of an initial page and a second portion for display of another page and not for use for the display of the initial page. At least a portion of the product information is transmitted from the server which is updated to reflect transactions, performed via interaction by a user with the displays, as soon as they occur. At least a portion of the displays is on a television. The server is configured to generate a display update as soon as the product information changes.

The set-top box is configured to, based on the first portion, display the initial page, and responsive to a navigation command from the input device and based on the second portion, display the another page. The set-top box also (i) receives the display update in a transmission subsequent to the single transmission, and (ii) responsive to the display update, refreshes a currently displayed page, e.g., even without receipt of a user command, by replacing portions and/or the entirety of the displayed page with data from the display update.

The system for providing an electronic transactional environment may be configured to finalize transactions performed via interaction by the user with the displays after confirming that the product information data related to the transactions is up-to-date. Further, the server may be updated on a real-time basis to reflect the finalized transactions as soon as they occur.

In an exemplary embodiment of the present invention, the server is updated to reflect transactions as soon as they have been completed, i.e., within a few seconds (e.g., within one second), and product display updates are received by the set-top boxes as soon as there is a change in the product information data, e.g., within three seconds.

In an exemplary embodiment of the present invention, the server is configured to transmit the display update only when at least a portion of the product information data has changed.

In an exemplary embodiment of the present invention, the product information stored at the server is updated to reflect transactions performed at least one of in (i) real space, (ii) via the Internet, and (iii) via an Interactive Voice Response (IVR) system, as soon as they occur.

In an exemplary embodiment of the present invention, the set-top box is configured to update a virtual shopping basket based on input received from the user during a navigation of the navigable pages to virtually include the product, and the server configured to provide a price update included in the display update. The price update may be customized to the user and based at least in part on a state of the virtual shopping basket.

In an exemplary embodiment of the present invention, the product information data includes a price for the product and the display update includes an updated price for the product. At least one of the price and the updated price of the product is customized to the user and based at least in part on transactions by the user conducted external to the transactions performed via interaction by the user with the displays.

In an exemplary embodiment of the present invention, the set-top box is configured to receive from the input device a shopping session initiation instruction and, responsive to the instruction, transmit towards the server a request for the product information data, wherein the single transmission is responsive to the request and addressed to the set-top box.

In an exemplary embodiment of the present invention, the set top box forms part of the television.

In an exemplary embodiment of the present invention, the single transmission further includes navigation instructions controlling which particular portion of the product information data should be displayed on the television at any particular time, and where on the television each part of the particular portion should be displayed.

According to an exemplary embodiment of the present invention, an article of manufacture has stored thereon instructions executable by a processor, the instructions which when executed cause the processor to perform a method for providing an electronic transactional environment. The method comprising: receiving a user request; in a single transmission and in response to the user request, receiving product information data for a product information display spanning multiple navigable pages, the product information display including product information and order information for a product available for purchase, the product information data including a first portion for display of an initial page and a second portion for display of another page and not for use for the display of the initial page, wherein at least a portion of the displays is on a television and at least a portion of the product information data is transmitted from a server; based on the first portion, displaying the initial page; receiving a navigation command from a user; responsive to the navigation command and based on the second portion, displaying the another page; transmitting a display update subsequent to the single transmission; automatically refreshing a currently displayed page by replacing portions and/or the entirety of the displayed page with data from the display update; finalizing a transaction performed via interaction by the user with the displays after confirming that the product information data related to the transaction is up-todate; and updating the server as soon as the transaction is finalized to reflect the finalized transaction.

BRIEF DESCRIPTION OF THE DRAWINGS

FIGS. 5 to 29 illustrate additional screenshots that may be provided for display on a television during a shopping session, according to exemplary embodiments of the present invention.

DETAILED DESCRIPTION

Figure 1:
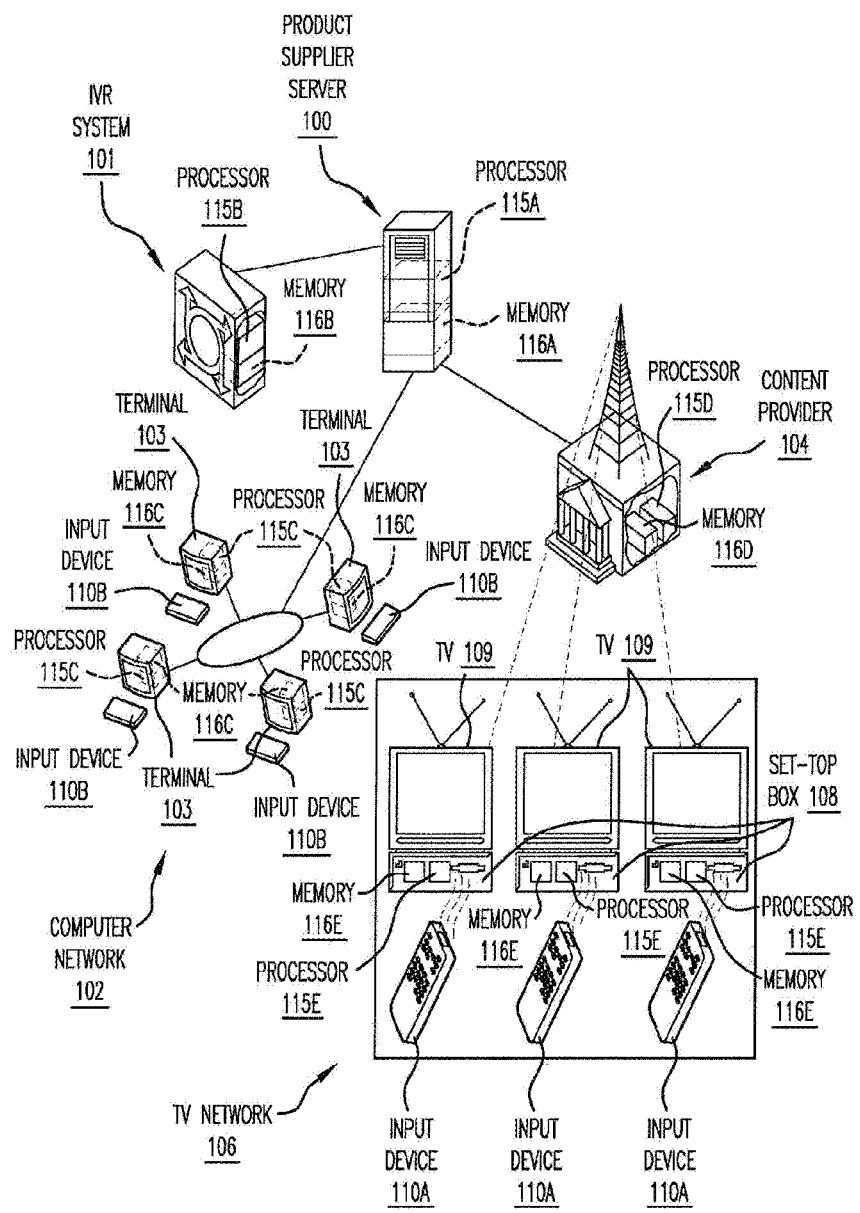
FIG. 1 is a block diagram that illustrates components of a system according to an exemplary embodiment of the present invention.

FIG. 1 is a block diagram that illustrates exemplary components of a system according to an example embodiment of the present invention. The system may include a product supplier server 100, an IVR system 101, a computer terminal network 102, a content provider 104, and a television network 106 including a plurality of set-top boxes 108, each of which is associated with a corresponding TV 109 and corresponding input device 110A, such as a remote control. The set-top boxes 108 may be separate from or integrated with their corresponding TVs 109. The product supplier server 100 may include information regarding products and customers. In one exemplary embodiment of the present invention, each of the IVR system 101, the computer terminal network 102, and the content provider 104 may be in communication with the product supplier server 100 and may input, modify, and retrieve data of the product supplier server 100.

Each of the server 100, IVR system 101, terminals 103 of the computer terminal network 102, content provider 104, and set-top-boxes 108 may be controlled by a corresponding processor(s) 115A-E, respectively (collectively referred to herein as processor 115). The processor 115 may be any one or combination of suitably appropriate processing systems, such as, for example, a microprocessor, a digital signal processor, and a field programmable logic array. The processing system may be embodied as any suitably appropriate computing device, e.g., a computer, PDA, laptop computer, notebook computer, a hard-drive based device, or any device that can receive, send, and store data. For the control, the processors 115 may execute program instructions. Some of such instructions may be pre-installed or manually loaded over time. Others may be transmitted between the different system components. Program instructions may be in any suitable form. In particular, some or all of the instructions may be provided in programs written in a self-describing computer language, e.g., Hyper Text Markup Language (HTML) or eXtensible Markup Language (XML). Transmitted program instructions may be used in combination with other previously installed instructions, e.g., for controlling a manner of display of data items described in a received program markup sheet.

Each of the server 100, IVR system 101, terminals 103 of the computer terminal network 102, content provider 104, and set-top-boxes 108 may include or be in communication with memories 116A-E, respectively (collectively referred to herein as memory 116), for storing data and/or program instructions. The memory 116 may include any combination of memory circuits, including electrical, magnetic, and/or optical systems. The memory 116 may include, for example, read only memory (ROM), random access memory (RAM), and/or bulk memory.

While only the IVR system 101, computer terminal network 102, and television network 106 are explicitly discussed, other conduits via which to conduct transactions may be included in the system and may be in communication with the content provider 104 server 100 for data retrieval and update. While only one content provider 104 is shown in FIG. 1, a plurality of content providers may be connected to the product supplier server 100. Similarly, while only an input device 110A embodied as a remote control is shown in FIG. 1, the input device 110A may be embodied as any suitably appropriate input device 110A, e.g., a keyboard or keypad, such as one integrated with a TV 109 or a touch screen of the TV 109. Further, while only input devices 110A associated with set-top boxes 108 are discussed, other input devices 110 may be similarly provided for other terminals, such as input devices 110B for terminals 103 of the computer terminal network 102.

The computer terminal network 102 may include terminals 103. A product supplier's employees, for example, may use terminals 103 to conduct transactions in real space and access the product supplier server 100 to retrieve product and customer information for conducting the transactions and to update data to reflect the performed transactions. Terminals 103 may also operated by customers, e.g., who may connect to the product supplier server 100 (or another server 100 that is connected to the product supplier server 100) via the Internet, to conduct transactions. The data of the product supplier server 100 may be manually or automatically updated based on the conducted transactions.

Similarly, the IVR system 101 may be connected to the product supplier server 100 for retrieval of data from the server 100 to provide, e.g., product information, to a customer who logs into the IVR system 101, and for automatic updates to the data of the product supplier server 100 based on a conducted transaction, or based on new customer information.

The content provider 104 may transmit program content pertaining to the product supplier's products to a set-top box 108, receive from the server 100 and transmit to the set-top box 108 product and/or customer information, and receive from the set-top box 108 and transmit to the server 100 user transaction interaction information. The set-top box 108 may render content received from the content provider 104 for display on a user's TV 109, receive commands from the user, e.g., via the user's input into the corresponding input device 110A, such as a remote control, touch screen, and/or keypad, transmit information to the content provider 104 in response to some of the user commands, and change the television display in response to the same or other of the user commands.

In an example embodiment of the present invention, product information of the product supplier server 100 that is displayed on a user's TV 109 by the user's set-top box 108 based on data received from the content provider 104 may reflect a real-time product state as determined by a combination of transactions conducted via each of the computer terminal network 102, the IVR system 101, and the television network 106 (and any other conduit in communication with the content provider 104 server 100 and via which transactions may be processed) and for which information is updated at the supplier server 100 as soon as a transaction is processed.

In an example embodiment of the present invention, content to be provided in multiple display pages (or frames) may be provided to the set-top box 108 during a single communication from the product supplier server 100 to the set-top box 108 via the content provider 104. For example, the data of the single communication may include data based on which a plurality, e.g., all, of the product information display pages of a shopping session may be generated. The content provider 104 may forward the request to the product supplier server 100. The product supplier server 100 may generate a file, e.g., an XML document, which includes data concerning relevant products. The single file may include navigation information and product descriptors for display, e.g., over multiple pages between which the user may navigate via input entered into the remote control 110A for control of the set-top box 108. In one example embodiment, some or all of the navigable pages may be displayed on the TV and/or on a display of the remote control 110A. The single file transmission allows the user to navigate the pages in a real-time uninterrupted manner with minimal delay navigating between pages. As explained below, however, even according to the embodiment in which all of the navigable pages and associated data are transmitted in a single file, all or portions of the product information data may be re-transmitted during the shopping session to keep the navigable pages current. For example, when a user begins a transaction session, the set-top box 108 may transmit to the content provider 104 a request for product information. Any data updates may be used to replace outdated data in the navigable pages, for example, without replacing the entirety of the navigable page.

In an alternative example embodiment, the navigation information may be predetermined and programmed into the set-top box 108 for universal application to all or a plurality of files, e.g., of a predetermined type, to be sent to the set-top box 108. In one example embodiment, the set-top box 108 may be periodically updated (on a set schedule or otherwise) with navigation updates. According to the embodiment in which the set-top box 108 is programmed with predetermined navigation information, the product information file may include the product descriptors for display over the multiple pages, without navigation information. The set-top box 108 may interpret the product descriptors in light of the preprogrammed navigation information. In one example embodiment, some navigation information may be transmitted together with the product information data, while other navigation information, e.g., universally applied navigation information, may be preprogrammed at the set-top box 108.

According to any of the above embodiments, after receiving the file from the content provider 104, the set-top box 108 may display an initial page of product information determined based on the combination of the received product information and the navigation information. Based on the combination of the navigation and product information, the set-top box 108 may interpret a command received from the remote control 110A while the initial page is displayed as a command to generate and display another page of product information, including other product information provided in the single file. The procedure may be repeated along multiple navigation paths from one page to another. Accordingly, the navigation between the multiple pages of product information may be based on the single file received in response to the communication to the product supplier server 100 made by the set-top box 108 at the beginning of the transaction session.

The user may press a help button, e.g., towards the bottom of the display, for assistance. A screen explaining the interactive purchasing process, e.g., as shown in FIGS. 21 to 23, may then appear on the screen one at a time depending on selections by the user.

An example application of preprogrammed navigation information to product information received in the single file may be where different products are associated with different sets of attributes. Some of the navigation information may be applicable to products having certain attributes, but not to other products that do not have those attributes. For example, navigation information may provide for interpreting input received by the set-top box 108 as a command to proceed to another page in the navigation sequence that displays a list of selectable colors. This page may be displayed for those products having a color selection attribute, e.g., those products that come in different colors, but not for those products that do not have a color selection attribute, e.g., those products that come in only one color. Thus, the particular navigation sequence that may be traversed by the user may be based on the combination of the preprogrammed navigation information and the product information received in the single file. The product supplier server 100 may provide product information by generating and transmitting an XML document including metadata labels for one or more data items. A non-exhaustive list of the data items may include position information, image information (e.g., for display of thumbnail), product description, price, size(s), color(s), style(s), and flex pay (e.g., indicating a payment option). Of the listed data items, some may be applicable to some products but not to other products.

In an example embodiment of the present invention, product information updates may be transmitted to the user's set-top box 108 as they occur for display in a real-time manner, with respect to attributes such as those of a non-exhaustive list including price, availability, options, and customer-specific rebates. The rebates may be used to modify the price provided to the user. The rebates may be provided based on a customer transaction history including a combination of the customer's TV shopping session, IVR system 101, computer network terminal 103, and real space transaction histories. The shopping session history may be recorded by the set-top box 108 and may include an indication of all products and corresponding quantities added to a virtual session basket. To ensure that a real-time price based on the combination of histories is provided to the customer conducting a TV transaction, a call from the set-top box 108 to the product supplier server 100 via the content provider 104 requesting an updated price may be made when the customer indicates the customer's readiness to complete a transaction. The price returned in response to the call may incorporate a rebate based on a transaction entered into by the user in a venue other than the current interactive TV shopping session, e.g., concurrent with the current interactive TV shopping session.

In one example embodiment, the set-top box 108 may transmit the session history to the product supplier server 100. The server 100 may then generate a customer price based on the history combination, including the session history. In an alternative example embodiment, the set-top box 108 may transmit a price call to the server 100 without the session history. The set-top box 108 may return a customized price based on the history combination excluding the session history. Based on conditions, e.g., with which the set-top box 108 is preprogrammed or that the set-top box 108 previously received from the content provider 104 or received with the customized price, the set-top box 108 may update the customized price to reflect the locally stored session history.

In an example embodiment of the present invention, after a first transmittal of a shopping session from the product supplier server 100 ultimately to the set-top box 108, which is in response to a request for information by the set-top box 108, the product supplier server 100 may re-transmit to the set-top box 108, without further request by the set-top box 108, product information during the shopping session. Such unprovoked transmissions by the set-top box 108 are referred to herein as a data push. In one example embodiment, the re-transmission may be periodic, e.g., at set intervals, regardless of changes to the product information. In an alternative example embodiment, the re-transmission may be selectively performed responsive to changes to the product information. In one example embodiment, a data push may include an entirely new set of data including the changes. In an alternative example embodiment, a data push made in response to a change may include only the changes, so that the set-top box 108 can update the displays and navigation based on a combination of the previously received data and the subsequent data push.

In one example embodiment, the re-transmissions may be similarly performed with respect to set-top specific data. For example, customized pricing, as explained above, may be included in the product information.

In one example embodiment, aside from certain customized transmissions of data by the product supplier server 100 to the set-top box 108, e.g., the transmission responsive to the call towards an end of a shopping session, the data transmissions may be broadcast to all set-top boxes 108. For example, the product supplier server 100 may transmit the product information periodically to the content provider 104 for broadcasting of the product information to all set-top boxes 108. (The initial transmission path of the data from the product supplier may be to a single or multiple content providers 104. However, the data may be transmitted without addressing any particular set-top box 108. In this way, the transmission may be considered a broadcast, even where it is to a single content provider 104.)

In one variant of this embodiment, with respect to a shopping session of a set-top box 108, the first transmission by the product supplier server 100 to the set-top box 108 may be responsive to a request by the set-top box 108, so that a delay does not occur at the set-top box 108 while waiting for a first transmission of the session, which may otherwise occur if the set-top box 108 waits for broadcast data. Subsequent transmissions may be broadcast transmissions, e.g., except for transmissions of customized data and/or transmissions to subsequent requests made by the set-top box 108. Such subsequent requests may be, e.g., because of data corruption perceived by the set-top box 108. Any suitable method of data corruption detection may be performed by the set-top box 108.

In one example embodiment, after receipt by the set-top box 108 of the first transmission from the product supplier server 100, the set-top box 108 may render the data for display at the set-top box 108's corresponding TV 109. In response to commands received from the user, the set-top box 108 may change the display in a manner representing navigation between multiple pages. If a data push is received by the set-top box 108 while a page is displayed, the set-top box 108 may dynamically change the display of the page in accordance with new information concerning the page that is included in the product push. For example, if a color options page is displayed that shows five color options when a data push is received that indicates that one of those options is no longer available, the set-top box 108 may dynamically update the display, even without receipt of any command from the user, to reflect the change in the color options. For example, the page may be updated so that one of the color options is removed from the display or so that one of the color options is displayed in a manner that indicates its unavailability, e.g., by being ghosted or by including a mark, such as "sold out" or "unavailable."

In one example embodiment, whether or not the set-top box 108 dynamically changes the display may depend on satisfaction of conditions of a rule set. For example, rule set may provide conditions that to ensure or tend to ensure that the display change is not perceived by a user as a disruption to the shopping session. For example, a first transmission of product information may include data interpreted by the set-top box 108 as requiring a separate page of color options. A second transmission of product information may include modified data interpreted by the set-top box 108 as not including a separate color options page, e.g., where the modified data indicates that the product comes in only one color. If, prior to receipt of the second transmission, the user had navigated to the color options page of the first transmission so that the color options page is still displayed at receipt of the second transmission, dynamic modification of the displayed page might entail a perceived disruption in the navigation. For example, a dynamic modification might include removing the currently displayed page (since the second transmission does not include the displayed page) and displaying an earlier (with respect to the navigation sequence) page, e.g., the first page of the shopping session. Such a modification may be perceived as a disruption. The rule set may therefore provide for dynamically updating the display conditional upon the continuance of the display of the page displayed at time of transmission (or a slightly later time to account for processing time). The set-top box 108 may be preprogrammed with the rule set and/or may receive the rule set or rule set updates with the transmissions from the product supplier set-top box 108. In one example embodiment, the content provider 104 may be the source of the rule set, rather than the product supplier server 100.

Figure 2A:
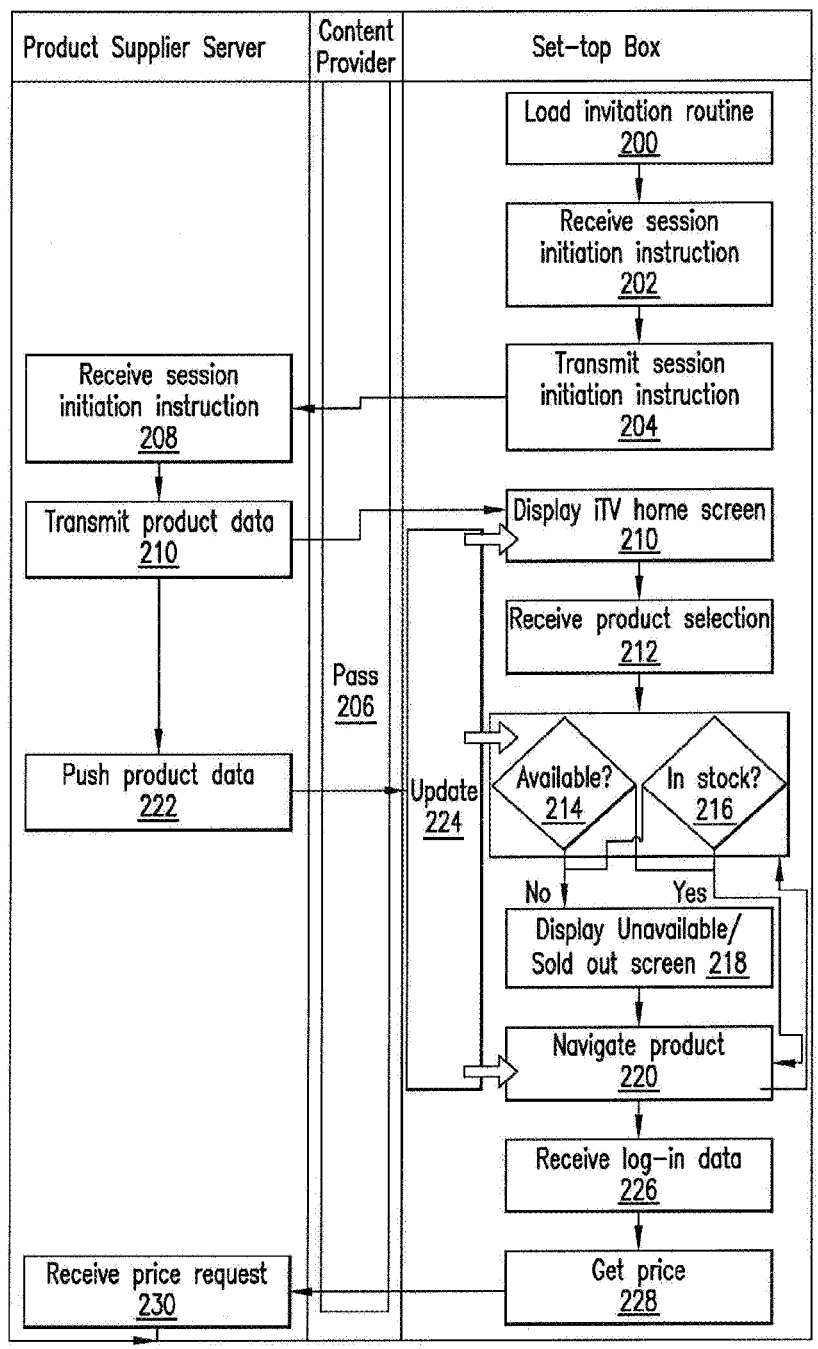
FIGS. 2A and 2B (collectively FIG. 2) is a cross-functional flowchart that illustrates a method for providing real-time TV e-commerce according to an exemplary embodiment of the present invention.
Figure 2B:
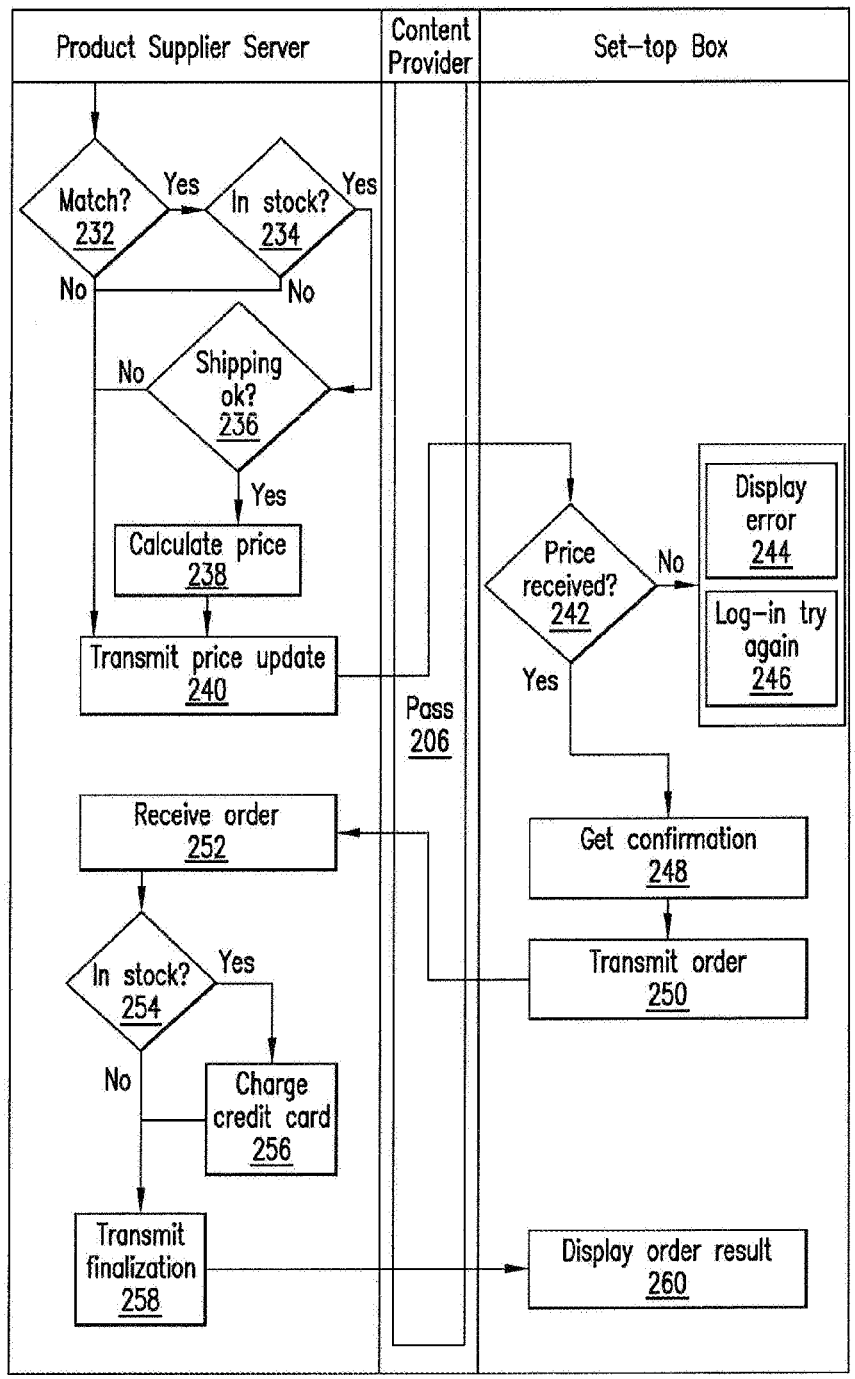

FIG. 2 (which is divided into FIGS. 2A-2B) is a flowchart that illustrates an exemplary flow across the product supplier server 100, content provider 104, and set-top box 108 for performing a real-time processing method for TV e-commerce. According to this exemplary embodiment, products of an iTV shopping channel, i.e., a channel that may be used as a portal to begin a shopping session, may be categorized into one or more of four categories. The categories may include a "currently on air" category, a "today's special" category, a "this day only" category, and a "most recently aired product" category. The currently on air product may be one that is featured on the channel's program at the time. The today's special product may be one that features a special price. The this day only product may be one that is presently thought by the product supplier to be available for only the present day. The most recently aired product may be a product aired prior to the currently on air product. The most recently on air product category may include a plurality of sub-categories. A first sub-category may be the immediately preceding on air product category. A second sub-category may be the second to most recently on air product, etc.

Figure 3:
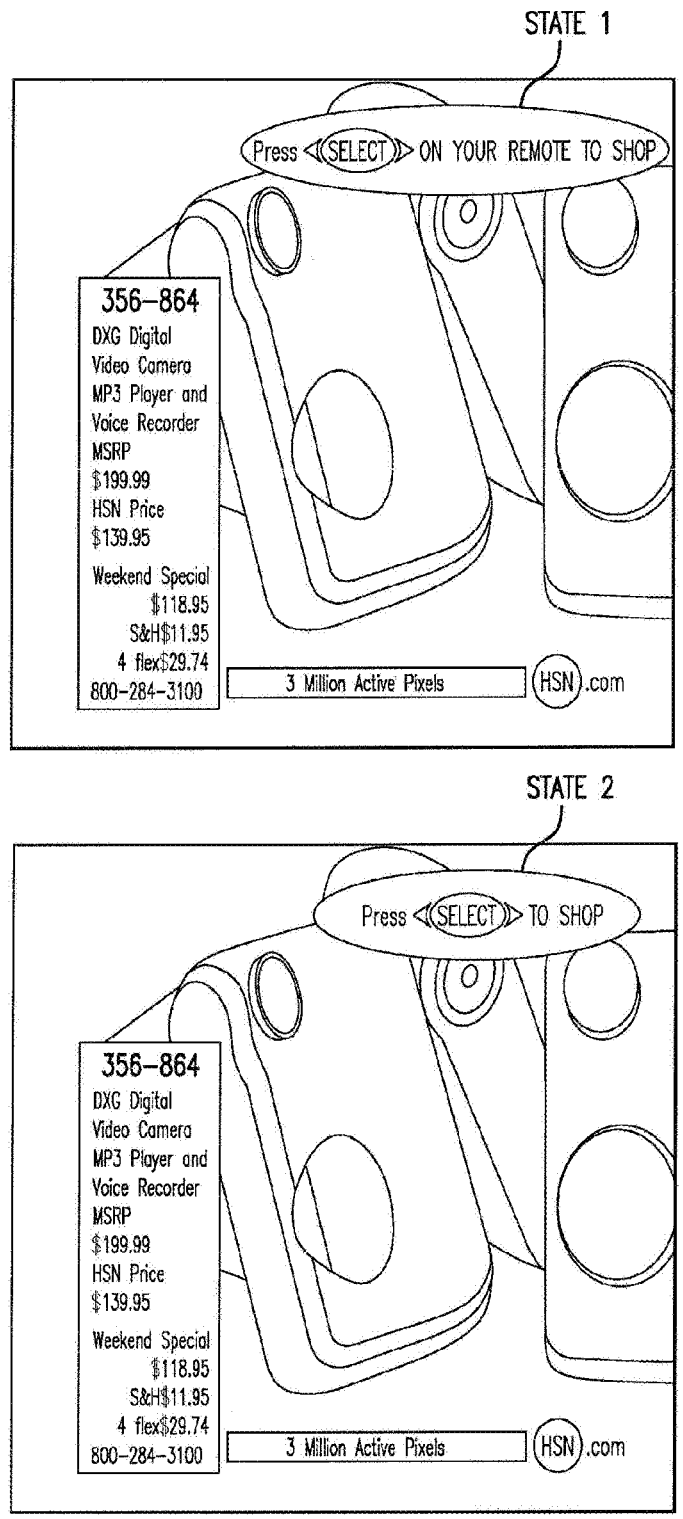
FIG. 3 illustrates screenshots corresponding to states between which a routine may loop for inviting a user to begin a shopping session, according to an exemplary embodiment of the present invention.

After a user instructs the set-top box 108 to tune to the iTV channel, the set-top box 108 may automatically display an instruction for initiating the shopping session. At 200, an invitation-to-shop routine may be automatically loaded upon tuning to the channel. For example, the set-top box 108 may be preprogrammed to auto-load the routine. Alternatively, the content provider 104 may transmit instructions to the set-top box 108, which, when executed by the set-top box 108, cause the set-top box 108 to load the routine. The invitation-to-shop routine may, e.g., loop between two display states (states 1 and 2), illustrated, respectively, in parts (a) and (b) of FIG. 3. In the first display state, a long versioned instruction, which states "Press select on your remote to shop," may be displayed. In the second display state, a short versioned instruction, which states "Press select to shop," may be displayed. In one example embodiment, the routine may loop between the two display states and off state in which no instruction is displayed.

Figure 5:
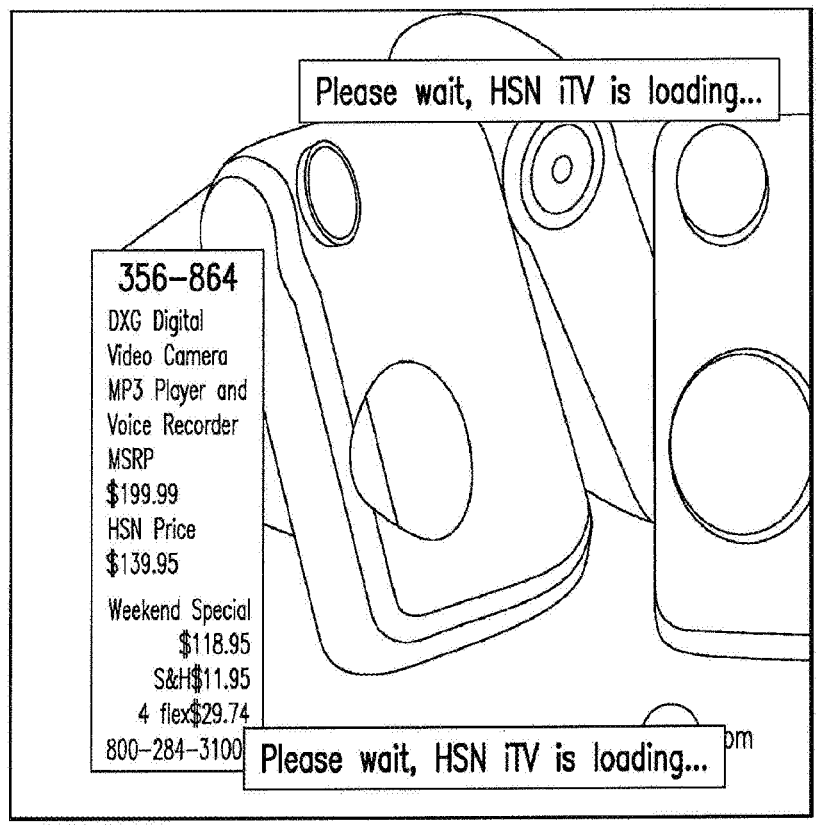

At 202, the set-top box 108 may receive a session initiation instruction from the user, e.g., via the remote control 110A. In response to the instruction, the set-top box 108 may perform a routine(s) for loading a session. In one exemplary embodiment, during loading of the session, the set-top box 108 may overlay on the display a message indicating that the session is being loaded, e.g., as shown in FIG. 5.

The routines for loading the session may include transmitting, at 204, a session initiation instruction to the content provider 104. The content provider 104, in turn, may, at 206, pass on the instruction by making a call to the product supplier server 100. As indicated above, in one exemplary embodiment, information used for providing a shopping session to the user may be periodically broadcast by the product supplier server 100 to the content provider(s) 104 without addressing any particular set-top box 108. According to this embodiment, a call to the product supplier server 100 may be omitted. The content provider 104 may handle the session initiation on its own by passing on the information to the set-top box 108. In yet another alternative embodiment, the content provider 104 may pass the periodically received broadcasts to the set-top box 108 without receipt of a request therefor from the set-top box 108. However, such unprovoked transmissions to set-top boxes 108 may be omitted so as not to cause a memory burden to the set-top boxes 108.

At 208, the product supplier server 100 may receive the session initiation instruction. At 210, the product supplier server 100 may transmit product data, e.g., in an XML document. The product data may include the currently on air product, the today's special product, the this day only product category, and/or the most recently aired products. According to one exemplary embodiment, the number of products about which data is transmitted may be limited to four. According to one exemplary embodiment, data about the two most recently aired products may be transmitted. According to one exemplary embodiment, data about the this day only product may be transmitted conditional upon an unavailability of a today's special product. According to one exemplary embodiment, if no more than a single product is associated with the combination of the on air, today's special, and this day only product categories, data about the three most recently on air products may be transmitted. If, there is also no presently on air product, data about the four most recently on air product may be transmitted. In one exemplary embodiment data of the most recently on air products that are still available may be transmitted. In an alternative embodiment, data of the most recently on air product may be transmitted regardless of present availability. The discussed precise number and types of products about which data is transmitted are exemplary.

Figure 25:
Figure 26:

Initiation of shopping sessions may be suspended at times. For example, at times, the product supplier server 100 may be temporarily shut down for maintenance. In these instances, transmissions of the product data by the product supplier may be suspended. When the transmissions are suspended, the set-top box 108 may receive an indication of the transmission suspension or may determine that the transmission suspension after a time-out from a time of transmitting a request for data (or from a previous receipt of the data, e.g., depending on whether the implemented embodiment is one that provides for the non-provoked data broadcasts, instead of responses to requests). If shopping sessions are unavailable, the set-top box 108 may display a message indicating the unavailability, e.g., as shown in FIGS. 25 to 27, in response to the user's instruction to initiate a session.

At 206, the content provider 104 may receive the data transmitted by the product supplier server 100 and transmit the data to the set-top box 108. At 210, the set-top box 108 may display an iTV home screen page based on the received data for display of information concerning the products described in the received data. The way in which the information is displayed may be in accordance with a rule set with which the set-top box 108 is preprogrammed or that is received with the product data.

Figure 4:
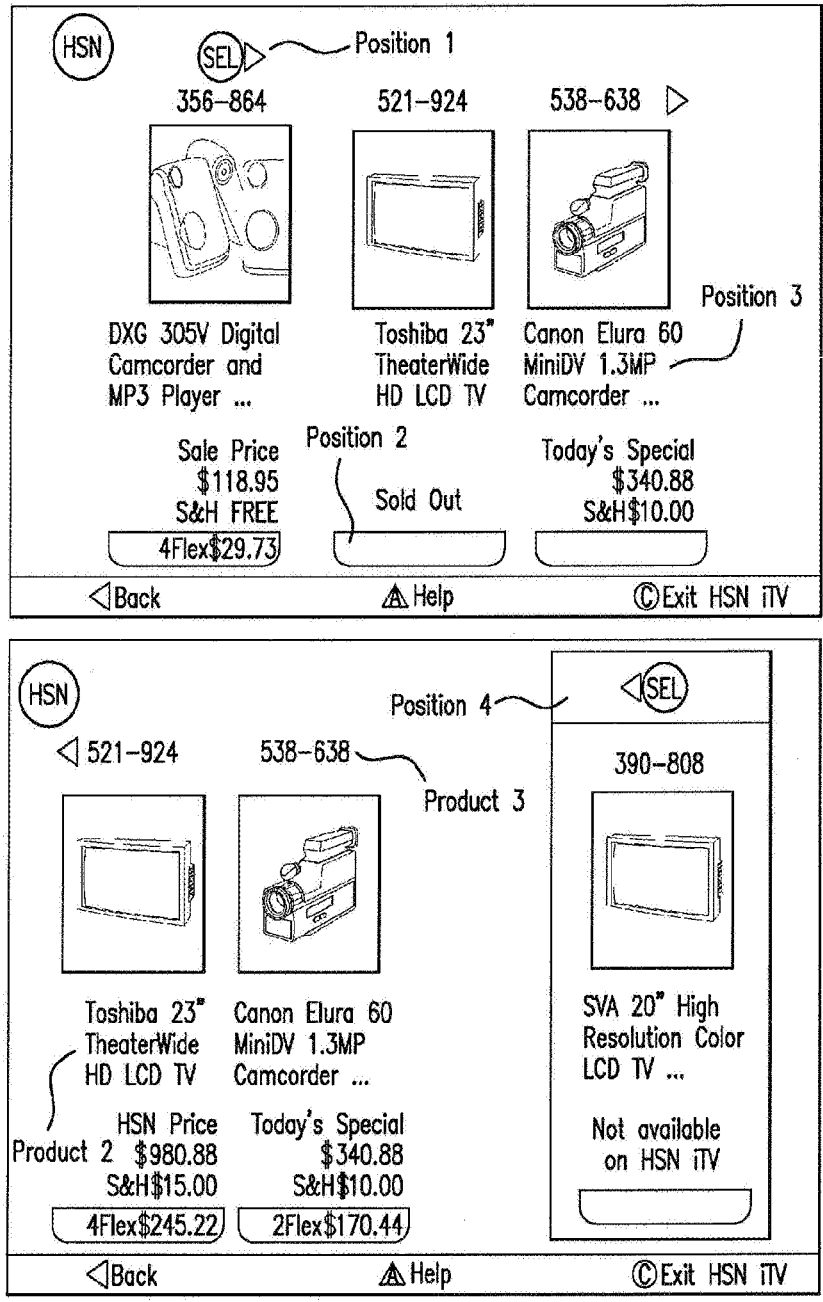
FIG. 4 illustrates iTV home screenshots that may be provided and dynamically changed, according to an exemplary embodiment of the present invention.

For example, the rule set may provide that information about only three products is to be simultaneously displayed. For display of information about a fourth product, a scrolling feature may be provided. For example, part (a) of FIG. 4 shows a screen shot of representations of a first three products and an arrow at the top right of the right-most of the representations of the three products, indicating that the user may scroll right for display of a representation of a fourth product. In response to input of a scrolling command, e.g., a right arrow of the remote control 110A, the set-top box 108, may shift the display so that the screen appears as is shown in part (b) of FIG. 4. The screen shot shown in part (b) of FIG. 4 is of representations of the last three products, the representation of the first product (the left-most product) having been removed. The screen shot also shows the arrow at the top left of the left-most of the representations of the three products, indicating that the user may scroll left for display of the representation of the first product. In response to operation of a scrolling instruction, the set-top box 108 may shift the activation of a page link of a first product representation to a following displayed product representation, until a page link of a last displayed product representation is displayed. In response to a subsequent scrolling instruction in the same direction, the set-top box 108 may shift the displayed representations as described and activate the page link of the newly added product representation. The set-top box 108 may indicate which representation's link is activated by highlighting the representation. For example, if the set-top box 108 receives a scrolling instruction to the right when the right-most representation of the screen shot shown in part (a) of FIG. 4 is highlighted, the set-top box 108 may display the screen shot shown in part (b) of FIG. 4, with the left-most product representation highlighted.

The rule set may provide that of the four product representations, the representation at position 1 should correspond to the currently on air product (if available), the representation at position 2 should correspond to the last most recently on air product, the representation at position 3 should correspond to the today's special product (if available), and the representation at position 4 should correspond to the second most recently on air product. If the today's special and currently on air products are one and the same, the rule set may provide for display of the product representation at position 1. If the product is no longer the on air product, but is the most recently on air product, the rule set may provide for display of the product representation at position 2. If it is the second to most recently on air product, third to most recently product, etc., then the rule set may provide for display of the product representation at position 3, the today's special position. The described rules of the rule set are exemplary.

At 212, the set-top box 108 may receive a product selection. For example, a product selection may be a signal received when the user presses a select button of the remote control 110A while a product representation is highlighted, i.e., the page link of the product representation is activated. In response to the selection, the set-top box 108 may, at 220, provide for navigation of multiple pages relating to the highlighted product. The navigation may include initially proceeding to a page associated with the activated link of the iTV home screen. The navigation may be performed based on the data transmitted at 210 and based on which the iTV home screen was displayed at 210.

Figure 6:
Figure 9:
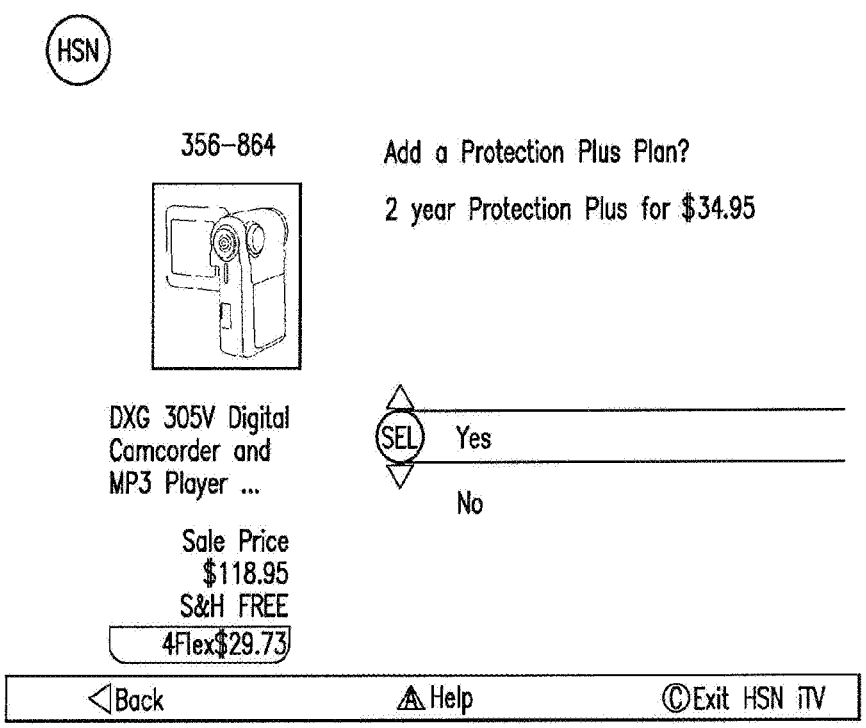
Figure 10:
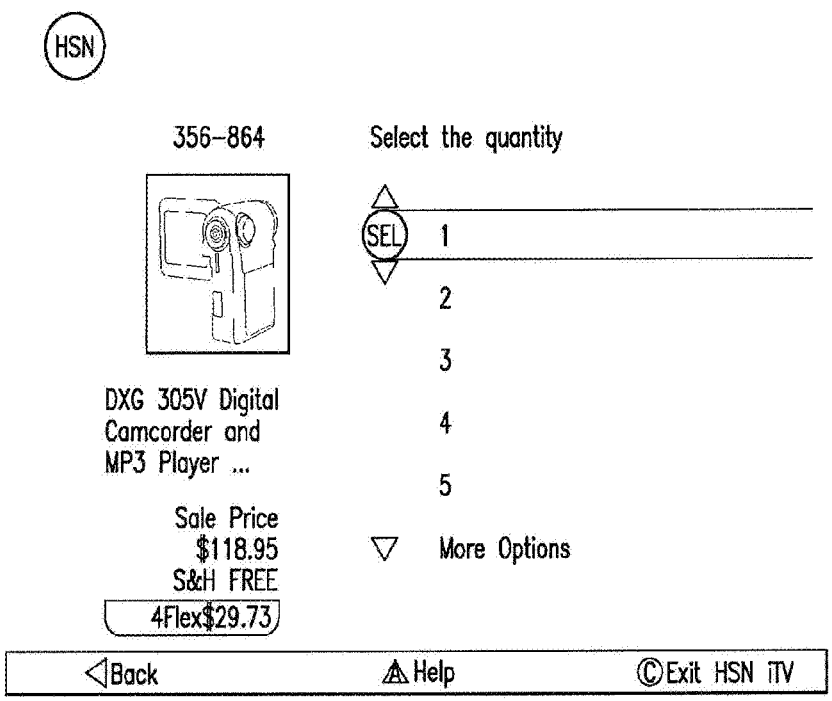

Navigation may be between a non-exhaustive list of pages that includes a product matrix page for selection of one of a plurality of product versions, e.g., as shown in FIG. 6, a color selection page, e.g., as shown in FIG. 7, a style selection page, a size selection page, a warranty selection page, e.g., as shown in FIG. 9, a quantity selection page, e.g., as shown in FIG. 10, and/or a payment options page, e.g., as shown in FIG. 8. The particular pages between which the user may navigate may depend of the product being navigated.

At 222, the product supplier server 100 may perform product data pushes, which may be performed periodically, e.g., at set intervals or as soon as the data is updated. The pushed product data may be received by the content provider 104 and transmitted to the set-top box 108. The set-top box 108 may, at 224, update the presently rendered display, e.g., the iTV home screen or another page to which the user has navigated, or information upon which the display to be rendered in the session is based, e.g., so that the allowed navigation or the information to be provided in the navigable pages is changed. For example, if both the home screen is displayed when the new data is received and the new data provides for a different home screen than the displayed home screen, the set-top box 108 may dynamically update the display to reflect the change. For example, the product for which a representation is displayed at position 1 might be indicated in the new data to be a most recently on air product, rather than the currently on air product. Accordingly, the set-top box 108 may move the representation to position 2 and may provide a representation of another product indicated to be the currently on air product in position 1. Similarly, the representation of the product in position 4 might be removed since the product is no longer the second to most recently on air product. In one exemplary embodiment, where the product representations are rearranged at 224, a product representation highlighted prior to the update may remain highlighted in its new position after the update (if the representation is not removed). Other updates may be with respect to the particular data provided in the home screen about each of the represented products, e.g., its price, its shipping and handling price, whether it is a sale price, whether it is still available, whether it is sold out, etc. For example, the representation in position 2 of FIG. 4 is of the same product in both of parts (a) and (b) of FIG. 4, but with different descriptive data. The representation in part (a) indicates that the product is sold out and the representation in part (b) indicates that the product is available by inclusion of a price.

The types of dynamic updates that are implemented may be restricted to limit a sense of disruption in the shopping session and/or to limit confusion. For example, rearranging the order in which the product representations appear and/or removing a representation may confuse the user, and may therefore be omitted.

It may occur that an update that indicates that a product is no longer available or sold out is received immediately after the user selects the product in the iTV home screen. Similarly, in an embodiment according to which a displayed product representation is not removed even after receipt of an update indicating its unavailability, it may occur that the user selects a product for which an update indicating its unavailability or that it is no longer in stock is received. At 214/216, the set-top box 108 may determine whether a selected product is available and in stock. If it is not available or not in stock, the set-top box 108 may, at 218, display an unavailable/sold out screen informing the user of this status. If the product is still available and not sold out, then navigation may be continued. In one exemplary embodiment, 214/216 may be performed even if the set-top box 108 has not received an update. 214/216 may be performed numerous times throughout a product navigation. For example, when the user selects a color in the color selection page, 214/216 may be performed to determine whether the color is available and in stock.

Once the user has made a complete product selection, the user may indicate a desire to create an order to purchase the selected product and/or options. In response to such an instruction, the set-top box 108 may display a screen for input of log-in data, e.g., as shown in FIG. 11. At 226, the set-top box 108 may receive the log-in data. Performance of 226 at this point in the sequence represented in FIG. 2 is exemplary. In an alternative exemplary embodiment, 226 may be performed when first initiating a shopping session. FIG. 11 shows two log-in screens, the top screen as initially presented to the user and the bottom screen filled out by the user. The screens are shown as overlapping for space purposes only.

Account data, including log-in data, may be locally stored at the set-top box 108 and/or may be stored at the product supplier server 100. For example, the set-top box 108 may provide a display screen requesting the user to input whether the user is a first-time user of the shopping program. If the user inputs data in the affirmative, the set-top box may provide one or more display screens for the user to input personal data, e.g., via the remote control 110A, to set up an account, which may be locally stored or stored at the server 100. In one example embodiment, at least some of the user entered data that provides billing information may be transmitted by the set-top box 108 to the server 100, so that the billing information can be used, e.g., to bill a credit card when an order is placed. In one exemplary embodiment not shown in FIG. 2, where the user enters log-in data for access to an existing account, the set-top box 108 may check whether the log-in data is correct. Alternatively, the product supplier server 100 may perform the check as discussed below.

After receiving the log-in data, the set-top box 108 may, 228, transmit a request to the product supplier server 100 via the content provider 104 to get a customized price for the user. For the request at 228, the set-top box 108 may transmit the selected product(s) information and the log-in data.

At 230, the product supplier server 100 may receive the request including the selected product information and the log-in data. At 232, the product supplier server 100 may determine whether the log-in data matches an existing account. If a match is found, the product supplier may determine at 234 whether the requested product with the selected options, if any, is available. If it is determined that the requested product is not available the user is so informed, for example, via the screen display shown in FIG. 29. If it is determined that the requested product and/or options are available and in stock, the product supplier server 100, may determine at 236 if shipping of the selected item to the matched customer is available. If it is determined that the item can be shipped, the product supplier server 100 may, at 238, calculate a customized price for the customer. The customization may be based on the number and types of products requested during the present shopping session and based on other orders of the customer, e.g., placed via the iTV or the other systems connected to the product supplier server 100. While the order is being processed the user may see a screen indicating such, for example, as shown in FIGS. 24 and 28.

After calculation of the price or immediately after any one of 232-236 for which a negative determination was made, the product supplier server 100 may, at 240, transmit a price update message, which may either indicate the price that will be charged or may indicate that the order could not be placed.

Figure 12:
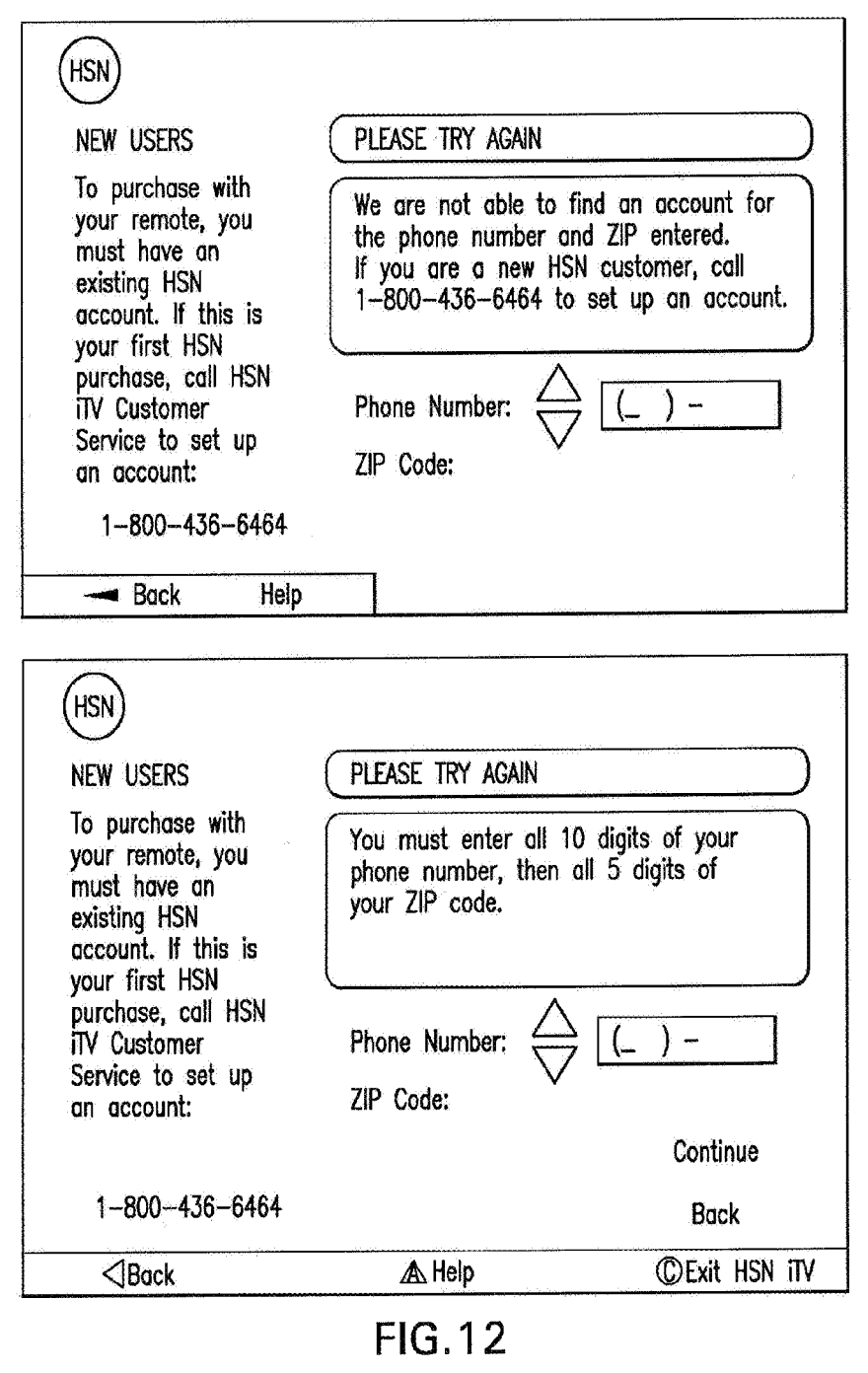

At 242, the set-top box 108 may determine whether the received message includes a price. If it does not include a price, the set top box 108 may, at 244/246, display an error message and/or provide for a re-log-in, e.g., as shown in FIG. 12, depending on the reason for the error indicated in the message received from the product supplier server 100. For example, if the product supplier server 100 determined at 232 that the provided log-in data was incorrect, this may be indicated in the message transmitted at 240. Subsequent to 246, the flow may continue again at 228. FIG. 12 includes two displays with different exemplary error messages. The screens are shown as overlapping for space purposes only.

Figure 17:
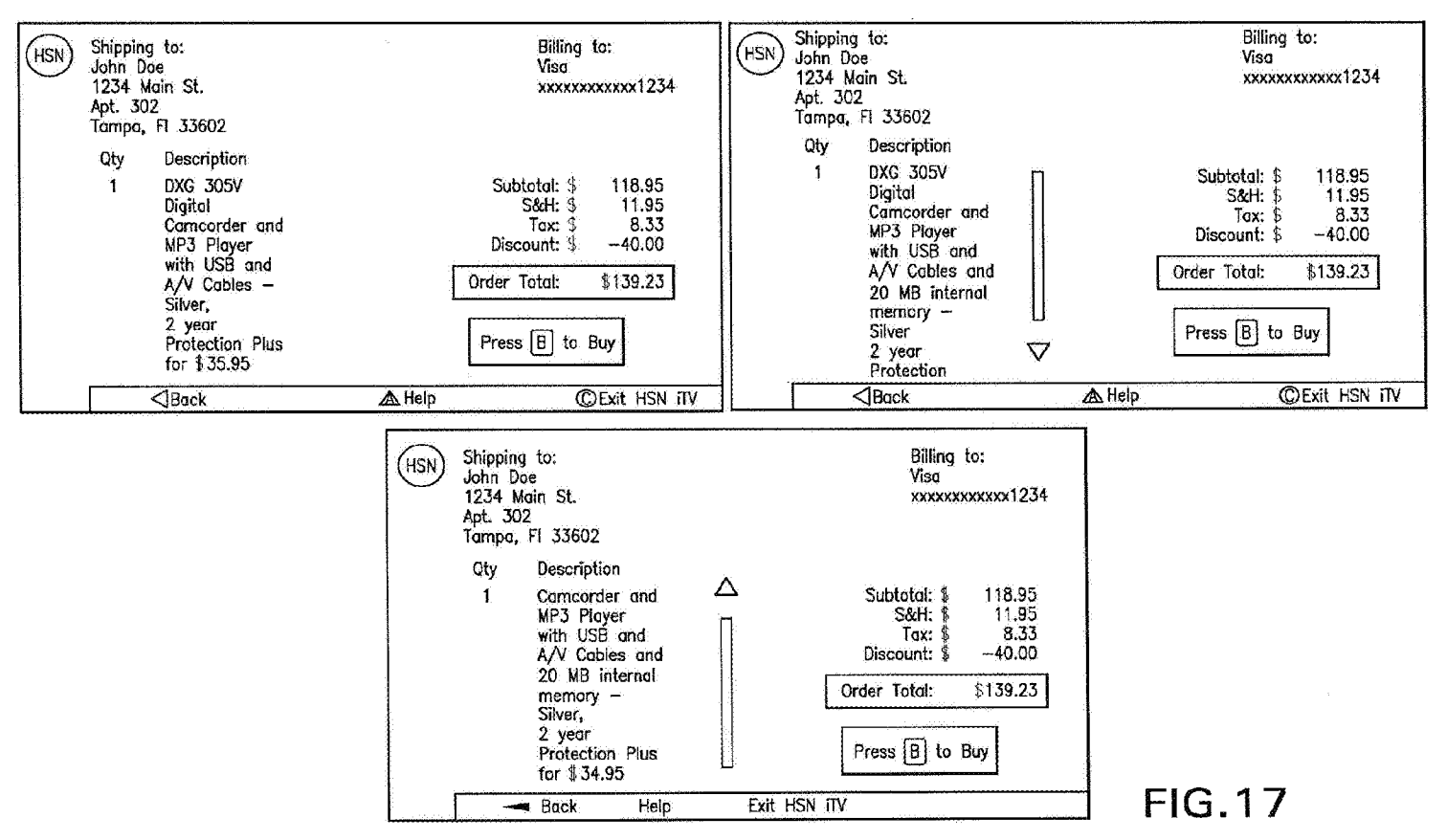

If the received message includes a price, the set-top box 108 may display the updated price to the user and get an order confirmation from the user at 248, e.g., via interaction with a display such as one shown in FIG. 17. After receiving the confirmation, the set-top box 108 may, at 250, transmit the order to the product supplier server 100 via the content provider 104. FIG. 17 shows three different exemplary display screens, each containing different order information.

At 252, the product supplier server 100 may receive the order. At 254, the product supplier server 100 may again check whether the ordered items are available and in stock. If it is determined that the items are available and in stock, the product supplier server 100 may, at 256, charge the user's credit card for which information is stored at the product supplier server 100.

Figure 19:
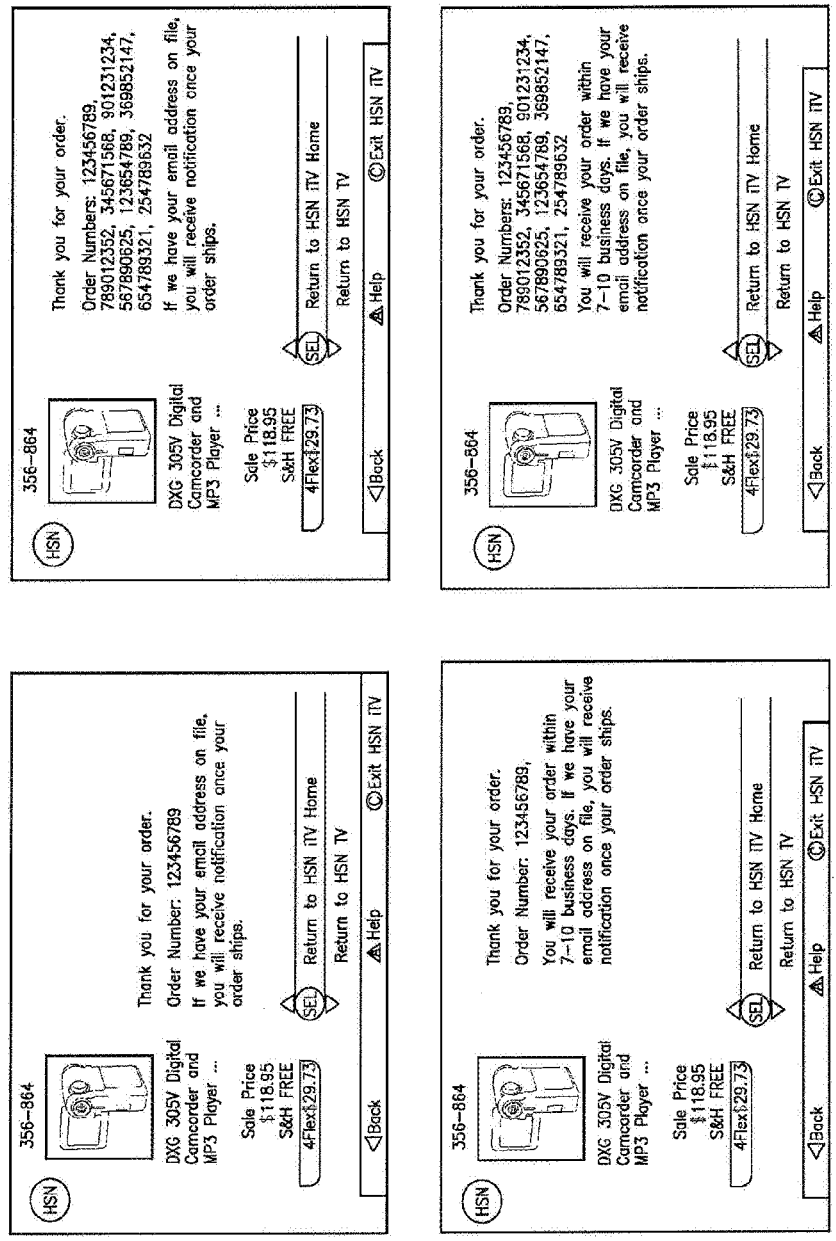

Subsequent to 256, or subsequent to 254 if it is determined at 254 that the items are not available and in stock, the product supplier server 100 may transmit order finalization data. The data may indicate the success or non-success of the order, when to expect the items, confirmation number, etc., e.g., as shown in FIG. 19. FIG. 19 shows four different exemplary confirmation screens, each containing different confirmation information.

In those instances where the content provider 104 server 100 transmits messages after determining that the requested items are unavailable or not in stock, e.g., after 234 or 254, the transmitted messages may identify particular errors. A non-exhaustive list of error messages may include a sold out error message, a waitlist message, a back order message, and a generic message.

Figure 13:
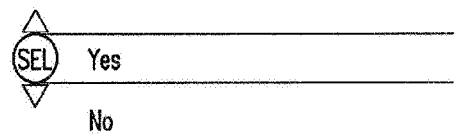

A sold out error message may be provided to indicate a product's status as having been sold out. At 244 or 260, the set-top box 108 may display the error message, e.g., as shown in FIG. 13. The user may navigate from the error message back to the iTV home screen or to the program channel, depending on an implemented embodiment.

Figure 14:
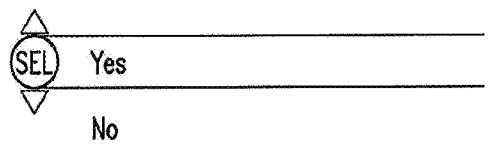

A waitlist message may be provided to indicate that the product is currently unavailable but that it is expected to be received and that a user may join a waitlist. At 244 or 260, the set-top box 108 may display the message and indicate that the user may provide input to instruct the set-top box 108 to add the user to the waitlist, e.g., as shown in FIG. 14. For example, the message may indicate that, if the user is added to the waitlist, the item will be shipped to the user immediately on becoming available if it becomes available within a certain period of time and that the user's credit card will be charged at that time. If the user agrees after display of the message at 244, the flow may continue again at 228, this time receiving a price at 242. In an alternative embodiment, the waitlist message may be transmitted with an updated price, in which case the flow may continue at 250. If the user does not agree to proceed with the order, the user may navigate from the error message back to the iTV home screen or to the program channel, depending on an implemented embodiment.

A back order message may be provided to indicate that the product is currently unavailable but that it is expected to be ready for shipment at a particular date. At 244 or 260, the set-top box 108 may display the message and indicate that the user may provide input to instruct the set-top box 108 to put the order through and have the items shipped and the credit card charged on the particular date, e.g., as shown in FIG. 15. The flow may then continue as discussed with respect to the waitlist message.

A generic message may be provided, e.g., as shown in FIG. 16, when some other non-specific error occurs, such as when a database cannot be accessed at the time. The user may navigate from the error message back to the iTV home screen or to the program channel, depending on an implemented embodiment.

The product supplier server 100 may receive requests for data, e.g., for a session initiation, price updates, order placements, and/or other product and/or customer updates from numerous set-top boxes 108, numerous terminals 103 of the computer terminal network 102, and numerous IVR system 101 calls. Responses to different ones of the calls may require different processing times. Accordingly, in an example embodiment of the present invention, the product supplier server 100 may maintain two asynchronously operated queues, an incoming queue and an outgoing queue. As requests are received, the requests may be added to the incoming queue. As the product supplier server 100 addresses the incoming requests, outgoing messages responsive to the requests may be generated and completed in a different order than in which the incoming requests to which the outgoing messages correspond were received. The outgoing messages may therefore be added to the outgoing queue in that different order, i.e., the order in which outgoing messages were completed. Each outgoing message may include a destination address to which the outgoing message is to be transmitted.

Those skilled in the art can appreciate from the foregoing description that the present invention can be implemented in a variety of forms. Therefore, while the embodiments of this invention have been described in connection with particular examples thereof, the true scope of the embodiments of the invention should not be so limited since other modifications and variations will become apparent to the skilled practitioner upon a study of the drawings and specification. Such modifications and variations are considered to be within the purview and scope of the appended claims and their equivalents.

What is claimed is:

1. A system for transmitting information to a user of a step-top box, the system comprising:
   a database configured to store user registration data and product information data relating to a plurality of products;
   a set-top box communicatively coupled to a remote control device having a touch screen;
   a server configured to:
      broadcast the product information data of at least one of the plurality of products to a plurality of set-top boxes, including the set-top box, to be displayed on touch screens of a plurality of remote control devices communicatively coupled to the plurality of set-top boxes, respectively, without the product information data being designated for a specific user of one of the plurality of set-top boxes, and
      transmit updated product information data that replaces at least a portion of the previously transmitted product information data of the at least one of the plurality of products to the plurality of set-top boxes to be displayed on the touch screens of the plurality of remote control devices, respectively; and
   a processor configured to:
      compare data relating to a transaction request from a user of the set-top box with user registration data of the user stored in the database to identify the user, and
      generate personalized user transaction data and personalized product information for the identified user of the set-top box,
   wherein the server is further configured to transmit programming instructions that include the personalized user transaction data and the personalized product information to the set-top box, such that the programming instructions configure the set-top box to control the remote control device communicatively coupled to the set-top box to display the personalized product information in a customized manner on the touch screen of the remote control device, with the customized manner of display being different than the display of the product information data that is broadcast to the plurality of set-top boxes.

2. The system of claim 1, wherein the server is further configured to transmit the updated product information data to the plurality of set-top boxes on a periodic basis.

3. The system of claim 1, wherein the processor is further configured to generate the personalized user transaction data and the personalized product information for the identified user of the set-top box based on a state of a virtual shopping basket of the identified user.

4. The system of claim 1, wherein the server is configured to transmit the product information data, the updated product information data, and the personalized user transaction data and the personalized product information to the set-top box over a computer network.

5. The system of claim 1, wherein the transaction request from the user of the set-top box is generated through a voice response system integrated in the remote control device communicatively coupled to the set-top box.

6. The system of claim 1, wherein the server broadcasts the product information data to the plurality of set-top boxes and transmits the updated product information data and the personalized user transaction data and the personalized product information to the set-top box of the identified user via one of a satellite and a content provider.

7. The system of claim 1, wherein the product information data relating to at least one of the plurality of products includes product information and order information for the at least one of the plurality of products, and the product information data includes a first portion for display of an initial page for a first product of the plurality of products and a second portion for display of a second page for a second product of the plurality of products.

8. The system of claim 1, wherein the personalized user transaction data and the personalized product information includes at least one of a specialized price based on the identified user, payment options available for the identified user, tax calculation and shipping and handling calculations based on the identified user's geographical location, shipping and handling options available for the identified user, and coupons and rebates available to the identified user.

9. The system of claim 1, wherein the programming instructions includes metadata that defines how the product information data is presented on the touch screen of the remote control device communicatively coupled to the set-top box of the identified user via a user interface application.

10. The system of claim 1, wherein the server is further configured to transmit the updated product information data via a continuous data stream to the set top box of the identified user, wherein the second updated product information data replaces at least part of the first updated product information data displayed on the touch screen of the remote control device communicatively coupled to the set-top box of the identified user.

11. A method for transmitting information to a user of a step-top box, the method comprising:
    storing, in a database, user registration data and product information data relating to a plurality of products;
    broadcasting, by a server the product information data of at least one of the plurality of products to a plurality of set-top boxes to be displayed on touch screens of a plurality of remote control devices communicatively coupled to the plurality of set-top boxes, respectively, without the product information data being designated for a specific user of one of the plurality of set-top boxes;
    transmitting, by the server, updated product information data that replaces at least a portion of the previously transmitted product information data of the at least one of the plurality of products to the plurality of set-top boxes to be displayed on the touch screens of the plurality of remote control devices, respectively;
    comparing, by a processor, data relating to a transaction request from a user of one of the plurality of set-top boxes with user registration data of the user stored in the database to identify the user of the one set-top box;
    generating, by the processor, personalized user transaction data and personalized product information for the identified user of the set-top box; and
    transmitting, by the server, programming instructions that include the personalized user transaction data and the personalized product information to the set-top box, such that the programming instructions configure the set-top box to control the remote control device communicatively coupled to the set-top box to display the personalized product information in a customized manner on the touch screen of the remote control device, with the customized manner of display being different than the display of the product information data that is broadcast to the plurality of set-top boxes.

12. The method of claim 11, further comprising transmitting, by the server, the updated product information data to the plurality of set-top boxes on a periodic basis.

13. The method of claim 11, further comprising generating, by the processor, the personalized user transaction data and the personalized product information for the identified user of the one set-top box based on a state of a virtual shopping basket of the identified user.

14. The method of claim 11, further comprising transmitting, by the server, the product information data, the updated product information data, and the personalized user transaction data and the personalized product information to the one set-top box of the identified user over a computer network.

15. The method of claim 11, further comprising generating the transaction request through a voice response system integrated in the remote control device communicatively coupled to the one set-top box of the identified user.

16. The method of claim 11, further comprising visually displaying the product information data via a user interface application on the remote control device communicatively coupled to the one set-top box of the identified user.

17. The method of claim 16, further comprising transmitting, by the server, navigation information that enables navigation of multiple pages of the user interface application.

18. The method of claim 16, further comprising presenting the personalized user transaction data and the personalized product information on the remote control device communicatively coupled to the one set-top box of the identified user as part of the user interface application.

19. The method of claim 17, further comprising:
processing, by the processor, a product request; and
transmitting, by the server, real-time confirmation of the product request to the one set-top box of the identified user.

20. The method of claim 11, further comprising transmitting, by the server, second updated product information data via a continuous data stream to the one set-top box of the identified user, wherein the second updated product information data replaces at least part of the updated product information data displayed on the touch screen of the remote control device communicatively coupled to the set-top box of the identified user.

* * * * *